(12) United States Patent
Fischel

(10) Patent No.: US 8,158,277 B1
(45) Date of Patent: Apr. 17, 2012

(54) CROSS-FLOW ELECTROCHEMICAL BATTERIES

(75) Inventor: Halbert Fischel, Santa Barbara, CA (US)

(73) Assignee: Global Energy Science, LLC (California), Santa Barbara, CA (US)

(*) Notice: Subject to any disclaimer, the term of this patent is extended or adjusted under 35 U.S.C. 154(b) by 0 days.

(21) Appl. No.: 13/171,080

(22) Filed: Jun. 28, 2011

Related U.S. Application Data

(60) Provisional application No. 61/388,359, filed on Sep. 30, 2010.

(51) Int. Cl.
- H01M 2/38 (2006.01)
- H01M 10/44 (2006.01)
- H01M 2/40 (2006.01)

(52) U.S. Cl. .............. 429/51; 429/70; 429/50; 429/81

(58) Field of Classification Search .......... 429/447–457, 429/513–514, 50–52, 61, 63–64, 67, 70, 429/74–81, 118, 347; 29/623.1–623.5
See application file for complete search history.

(56) References Cited

U.S. PATENT DOCUMENTS

| | | | |
|---|---|---|---|
| 3,902,916 A * | 9/1975 | Warszawski | 429/405 |
| 5,571,600 A * | 11/1996 | Licht | 429/188 |
| 5,830,593 A | 11/1998 | Nielson | |
| 6,319,293 B1 | 11/2001 | Debe et al. | |
| 6,713,206 B2 | 3/2004 | Markoski et al. | |
| 7,252,898 B2 | 8/2007 | Markoski et al. | |
| 7,348,101 B2 | 3/2008 | Gozdz et al. | |
| 7,488,547 B1 | 2/2009 | Iacovelli | |
| 2007/0020142 A1 | 1/2007 | Federspiel et al. | |
| 2010/0068623 A1 | 3/2010 | Braun et al. | |

OTHER PUBLICATIONS

Gabe et al, The rotating cylinder electrode: a recent development, Reviews of Applied Electrochemistr, J. of Applied Electrochemistry 13 (1983) pp. 3-22.
Gabe et al, The rotating cylinder electrode: its continued development and application, Reviews of Applied Electrochemistry 49, J. of Applied Electrochemistry 28 (1998) pp. 759-780.
Bagotsky, Fundamentals of Electrochemistry, 2nd Ed., John Wiley & Sons, Inc., Hoboken, NJ, USA, © 2006, §4.4—Convective Transport, pp. 60-67.
Newman, Electrochemical Systems, Third Edition, John Wiley & Sons, Inc., Hoboken, NJ, USA, © 2004, Chapter 17—Convective-Transport Problems, §17.3-§17.8, pp. 382-399.
Taylor, Stability of A Viscous Liquid Contained Between Two Rotating Cylinders, Philosophical Transactions of the Royal Society of London. Series A, Containing Papers of a Mathematical of Physical Character, vol. 223 (1923) pp. 289-343.

(Continued)

*Primary Examiner* — Barbara Gilliam
*Assistant Examiner* — Claire L Roe
(74) *Attorney, Agent, or Firm* — Sheldon L. Epstein; Malcolm J. Chisholm; Pamela J. Curbelo

(57) ABSTRACT

A cross-flow electrochemical cell for producing electricity is disclosed that incorporates means for cross-flow pumping of electrolyte through both anode and cathode electrodes in the same direction to achieve markedly higher discharging and charging currents. Cross-flow pumping enabling use of thick mesh electrodes comprising scaffolds impregnated with high-surface-area metal nanoparticles and having high porosity are also taught.

27 Claims, 7 Drawing Sheets

OTHER PUBLICATIONS

Newman, Electrochemical Systems, Third Edition, John Wiley & Sons, Inc., Hoboken, NJ, USA © 2004, Chapter 1—Introduction, §1.4 Transport, pp. 8-18.

Bogotsky, Fundamentals of Electrochemistry, 2nd Ed., John Wiley & Sons, Inc., Hoboken, NJ, USA, © 2006, Preface To First Edition, pp. xix-xxi & §1.6 Classification of Electrodes and Electrode Reactions, pp. 12-15.

Newman, Electrochemical Systems, Third Edition, John Wiley & Sons, Inc., Hoboken, NJ, USA, © 2004, Preface To The First Edition, pp. xix-xx & §1.2 Thermodynamics and Potential, pp. 4-7.

Pletcher & Walsh, Industrial Electrochemistry, 2nd Ed .II, London, UK, © 1982, Preface pp. viii-x; Chapter 7, §(d) pp. 346-350 & Chapter 11, p. 543.

R. Ferrigno et al, "Membraneless Vanadium Redox Fuel Cell Using Laminar Flow", JACS Communications, vol. 124, 2002, pp. 12930-12931.

Newman & Tobias, Theoretical Analysis of Current Distribution in Porous Electrodes, J. Electrochemical Society, vol. 109, No. 12 (Dec. 1962), pp. 1183-1191.

Ma et al, High Rate Micrometer Ordered LiNi0.5Mn1.5O4, J. Electrochemical Society 157 (8), pp. A925-A931 (Aug. 2010).

* cited by examiner

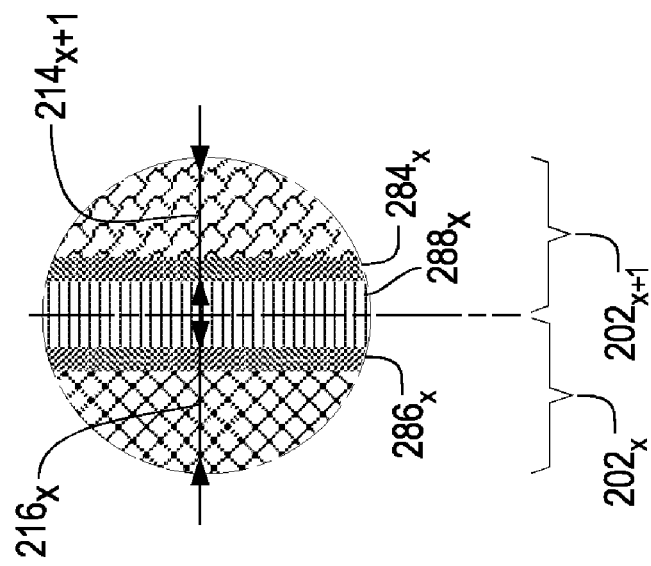
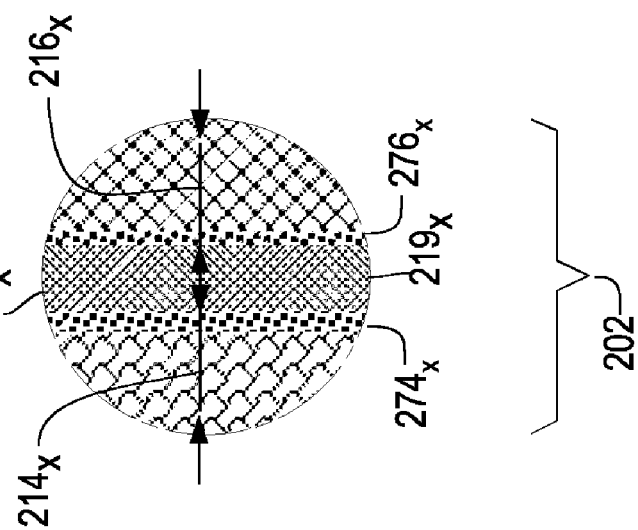

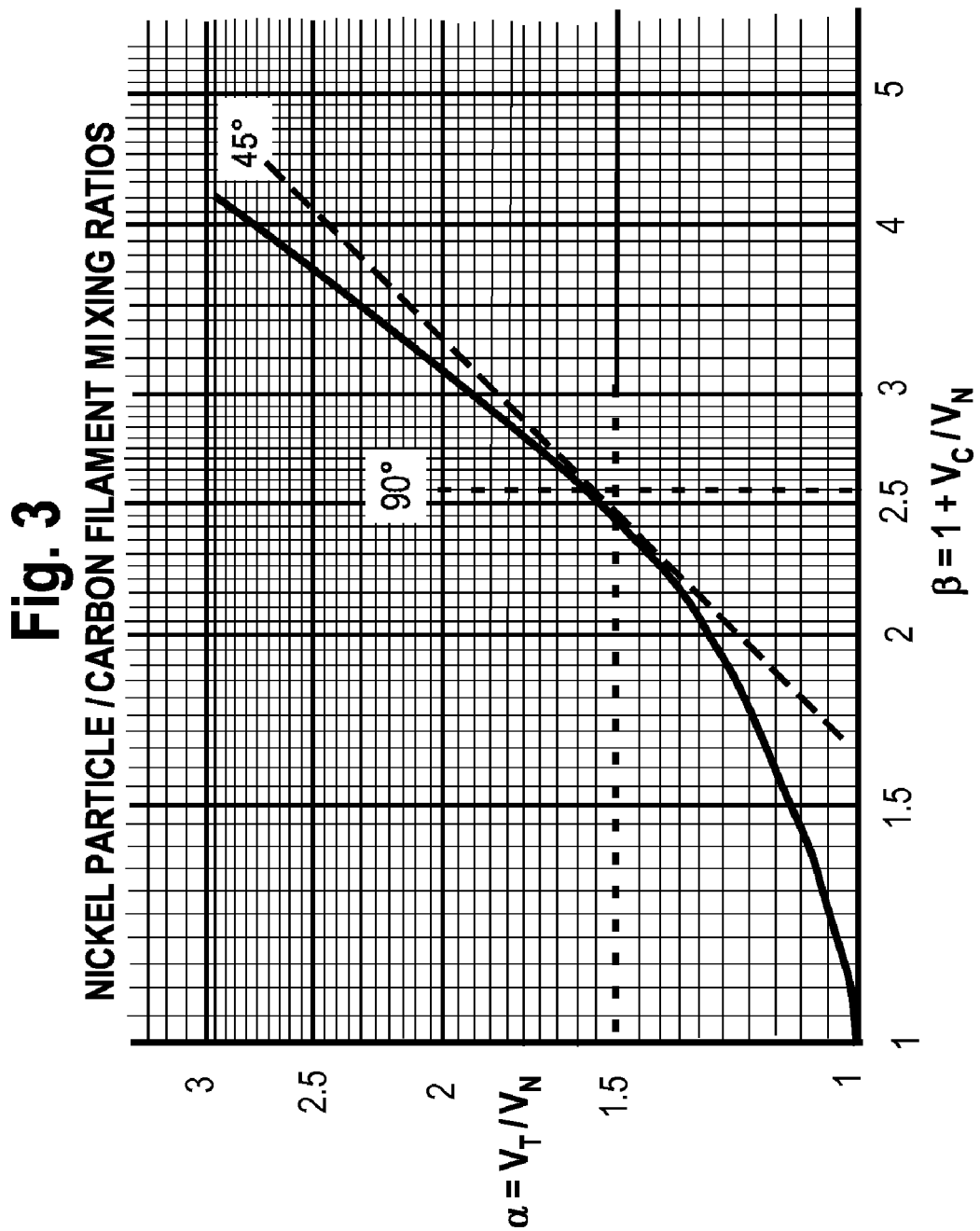

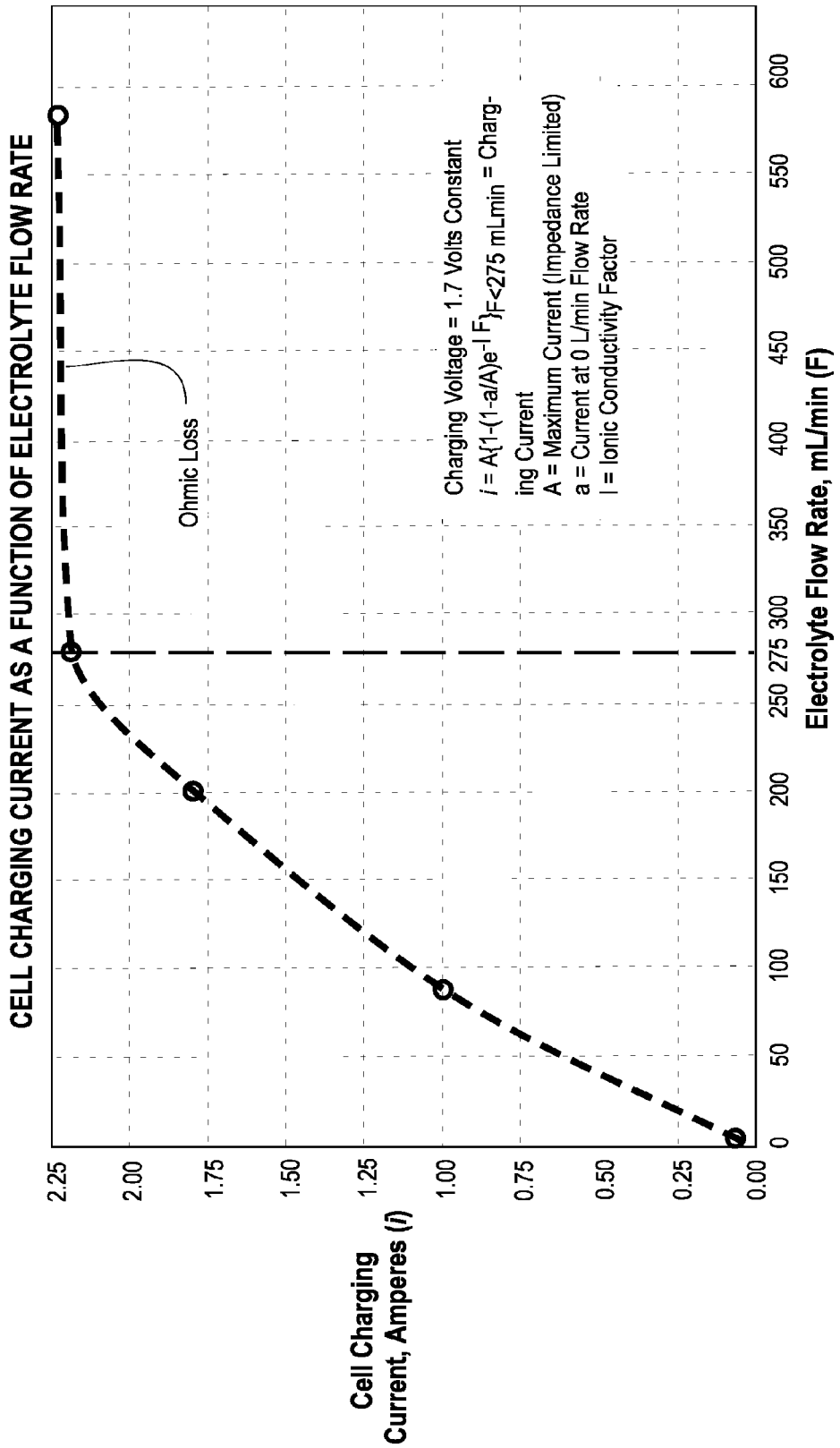

CROSS-FLOW ELECTROCHEMICAL BATTERIES

CROSS-REFERENCE TO RELATED APPLICATIONS

This patent application claims the benefit of U.S. Provisional Patent Application No. 61/388,359 filed 30 Sep. 2010, and of International Patent Application No. PCT/US10/39885 filed 25 Jun. 2010, which is a continuation-in-part of U.S. patent application Ser. Nos. 12/800,658 (U.S. Pat. No. 8,017,261 of 13 Sep. 2011); 12/800,710; 12/800,657; 12/800,672 (U.S. Pat. No. 7,972,747 of 5 Jul. 2011); and 12/800,709 (U.S. Pat. No. 7,964,301 of 21 Jun. 2011)—all filed on 20 May 2010. All of these applications claim priority from U.S. Provisional Patent Application 61/220,583 filed 26 Jun. 2009, are hereby incorporated herein by reference in their entirety and have been assigned to the assignee of this application.

STATEMENT REGARDING FEDERALLY SPONSORED RESEARCH OR DEVELOPMENT

Not Applicable

THE NAMES OF PARTIES TO A JOINT RESEARCH AGREEMENT

Not Applicable

INCORPORATION-BY-REFERENCE OF MATERIAL SUBMITTED ON A COMPACT DISK

Not Applicable

BACKGROUND OF INVENTION

1. Field of the Invention

This invention is in the field of electrochemical or galvanic batteries used to convert chemical energy into electrical energy and having means for providing cross-flow circulation of electrolyte in one direction through electrodes (U.S. Class 429/72, Int. Class H01M 2/36), to achieve accelerated chemical reaction rates that provide high electrical current and energy storage capacity.

2. Description of Related Art

Electrochemical cells for converting chemical energy into electricity (known as galvanic cells, which produce electrical energy) can be segregated into four classes based on their modes of storing and converting energy; namely:

Flow Cells (also known as Flow Batteries) that derive their energy from dissolution within the cells of externally stored binary electrolytes, such as a halide in a metal halide (e.g., chlorine in zinc chloride or bromine in zinc bromide). Flow cells may have one or two electrolytes. If either of the electrolytes passes through one electrode, it does not pass through the other. An example of a flow cell with one electrolyte is described in U.S. Patent Publication Nos. US 2010/0009243 and US 2010/0021805 A1 by Winter.

Fuel Cells that derive their reversible thermodynamic Gibbs free energy from external fuels, such as $H_2$, and use electrolyte for mass transport of protons or anions (e.g., hydroxide ions) between electrodes to support three-phase electrode reactions (e.g., electrode catalyst, electrolyte, fuel). An example is described in *Fuel Cells Comprising Laminar Flow Induced Dynamic Conducting Interfaces* ..., U.S. Pat. No. 7,252,898 issued on 7 Aug. 2007 to L. J. Markoski et al.

Pseudocapacitor cells (also known as supercapacitors, ultracapacitors and electrochemical double-layer capacitors) store redox reaction electropotential (voltage) electron or hole charges in a very thin electrolyte layer adjacent a solid phase faradaic material containing metal atoms that can change their atomic valance to acquire or free electrons or holes that move in the layer to form an electric double layer (EDL). The positive and negative charges travel very short distances only within their EDLs amongst shallow depths of solid phase atoms; but, not between electrodes. The first United States patent for a pseudocapacitor was No. 2,800,616 of 23 Jul. 1957 to H. I. Becker for a *Low Voltage Electrolytic Capacitor*. A more recent description is found in B. E. Conway, *Electrochemical Capacitors—Scientific Fundamentals and Technological Applications,* ©1999, Kluwer Academic/Plenum Publishers, New York, ISBN 0-306-45736-9.

Battery cells (also known as batteries, stacks or piles comprising one or more cells) store energy in their electrodes that is derived from chemical two-phase electrode redox reactions between faradaic materials (e.g., compounds or metallic states of iron, lead, lithium, nickel, silver, zinc, etc.) containing metal atoms that can change their atomic valance to acquire or free an electron or that can detach or acquire ions that are mobile in electrolytes. The ions must pass from within and between opposed polarity electrodes through the electrolyte while electrons from the redox reactions must simultaneously pass through an external electrical circuit. Electrolytes may be aqueous acid, alkaline or organic solvent or solute salts or metal cations that add or remove metal from electrodes. An example is described in Lithium-Ion Battery, U.S. Pat. No. 7,582,387 issued on 1 Sep. 2009 to W. G. Howard et al.

Each of these four cells has attributes that make it better suited for a particular application than the other three cells.

For example, flow cells excel at utility load averaging where excess utility energy can be used by balance-of-plant (BOP) to recharge electrolyte. Fuel cells excel at providing high energy output from external fuels that reside in compact containers needed for mobile applications. Pseudocapacitors are capable of emulating capacitors; but, can have two orders of magnitude higher capacity ratings in farads for meeting sudden load surges. Batteries do not charge or discharge as fast as pseudocapacitors; but, have vastly higher energy density ratings because their electrodes contain a much larger molar density of reaction-accessible faradaic material than those of pseudocapacitor EDLs and they can operate at higher voltages. Both attributes are a consequence of transferring ions between polar electrodes.

Energy density is expressed as watt-hours per cubic centimeter (wh/cm$^3$) or Joules/cm$^3$ or watt-hours per kilogram (wh/kg) or Joules/kg. Power density is measured in Watts/cm$^3$ or Watts/kg. Charge and discharge rates are stated as Joules per gram-second (Joules/gm-second) or amperes per gram (Amps/gm). Charging rates are a function of the internal impedance of the battery and a maximum suitable voltage that does not cause electrode polarization or cell damage. Another common figure of merit is Amp-hr per kg or per liter, which relates more directly to battery capacity and is independent of voltage under load.

C is the total charge or coulomb storage capacity of a slowly-charged battery in Ampere-hours. C-rate is a common metric for grading how rapidly a battery can reach full rated charge or discharge capacity based on useful charge or discharge times; for example, in one-hour (1 C) at rated charge or discharge voltages. If a battery is charged or discharged at an accelerated or decelerated rate, then the rate is expressed as a multiple of kC, where k=(dis)charge rate/1 rate and C'/C is a capacity ratio that is dependent on battery type. C'/C as a function of k represents a battery performance metric and is a measure of a battery's ability to accept accelerated charge and discharge rates.

Galvanic batteries of this invention comprise porous electrodes infused with electrolyte. Electrochemists have long understood that exposure of electrolyte to highly porous electrodes will greatly improve overall efficiency of electrochemical systems. Newman et al, *Electrochemical* Systems, $3^{rd}$ Ed., ©2004, Wiley Interscience, ISBN 0-471-47756-7, at Chapter 22—"Porous Electrodes" (pp. 517-565) presents analyses of porous electrodes suffused with electrolytes for two different types of electrochemical cells; namely, galvanic batteries (§22.4, pp. 535-551) and electrochemical reactors (§22.6, pp. 553-558), which require an input of energy to drive a reaction, used for recovery and removal of electropositive metals in solution. Only electrochemical reactors are described as comprising flow-through electrodes. There is no description of any galvanic battery or fuel cell employing a flow-through or a cross-flow electrolyte and porous electrode structure as described and claimed here.

A primary purpose in using such porous electrodes in any electrolytic cell or galvanic battery is to increase by several orders of magnitude the faradaic reaction surface exposed to electrolyte that fills its pores. A faradaic reaction occurs when an electric charge or mass participates in a charge-transfer reaction through an interface between dissimilar materials (e.g., an electrode-electrolyte interface). However, not all of the faradaic surface exposed to electrolyte may contribute to cell charge or discharge current.

Newman et al, at p. 538, FIG. 22.6, illustrates a pictorial or model of a prior art battery system containing a lithium foil anode, a cathode (positive electrode) and a separator interfaced between the two electrodes. The cathode is a substantially thick, porous volume containing a large faradaic material surface that is filled with electrolyte and has a current collector affixed to its end opposite of that nearest the separator. Thickness is measured in an orthogonal direction from the separator-cathode interface. The porous electrode is shown as divided into an unreacted zone adjacent the current collector and a reacted zone adjacent the separator.

The reacted and unreacted zones are divided from each other by a narrow reaction zone that is very much thinner than the thickness of the porous electrode. As the cell discharges, the narrow reaction zone moves toward the cathode's current collector so that the reacted zone becomes thicker and the unreacted zone becomes thinner. Movement of the narrow reaction zone increases the cell's internal resistance.

More important than internal resistance in limiting cell current is the width and position of the narrow reaction zone, which is very thin. The narrow reaction zone has a very small volume that reduces ionic mass transport rates and lowers electrolyte diffusion rates through the porous electrode. Because there are ionic species concentration gradients for anions (e.g., $O^{2-}$, $OH^-$) and cations (e.g., $H^+$, $Li^+$) in the porous electrodes, the position of the narrow reaction zone determines the number of ions available for completion of redox reactions. Both of these factors limit electric current in conventional cells and batteries.

One model of ionic species concentration as a function of position in a porous electrode is described in Newman & Tobias, *Theoretical Analysis of Current Distribution in Porous Electrodes*, J. Electrochemical Society, Vol. 109, No. 12 (December 1962), pp. 1183-1191. The authors caution that there is no consideration of capacitive effects of a double layer. This means that certain time-dependent processes, such as alternating current behavior and surge response, may not be accurately explained by the model. Nevertheless, the model highlights the spatial dependence of ion concentration and its effects on cell current. These limitations of ion mobility under diffusion, dispersion and migration gradients are common to all prior art galvanic cells with porous electrodes.

The total flux of a mobile ionic species in electrolyte is the vector sum of migration, dispersion, diffusion, and convection fluxes. Electrical current is proportional to the ionic species total flux per unit volume of electrode suffused with electrolyte rather than the reaction rate per unit of electrode cross-sectional area—also known as projected area. The flux value changes when species move, participate in an electrochemical reaction or change temperature. In conventional galvanic cells, diffusion, dispersion and migration fluxes have the greatest magnitudes, while the magnitude of convection flux ranges from very small to zero.

GENERAL DESCRIPTION OF THE INVENTION

Cross-Flow Electrochemical Batteries (CFEB) of this invention can utilize virtually every type of redox battery chemistry and are an improvement over conventional electrochemical or galvanic cells and batteries and Dynamic Accelerated Reaction Batteries Utilizing Taylor Vortex Flows (DARB), cited above. DARB employ Taylor Vortex Flows ("TVF"—also known as Taylor—Couette Flows) to induce high-shear-rate, laminar Circular Couette Flow (CCF) convection at electrode surfaces. DARB convection flows a) increase mass transport of reactants at electrode faradaic surfaces to accelerate electrode reactions and b) remove intermediate reaction products that retard chemical reactions.

Chemical and electrochemical cells—including fuel cells, galvanic cells and fuel reformers—utilizing TVF and CCF are described in my following patent applications:

Electrochemical Cells Utilizing Taylor Vortex Flows of U.S. patent application Ser. No. 12/800,658 filed on 20 May 2010, now U.S. Pat. No. 8,017,261 issued on 13 Sep. 2011;

Fuel Reformers Utilizing Taylor Vortex Flows, U.S. patent application Ser. No. 12/800,710 filed on 20 May 2010;

Chemical Process Accelerator Systems Utilizing Taylor Vortex Flows, U.S. Patent application Ser. No. 12/800, 657 filed on 20 May 2010;

Direct Reaction Fuel Cells Utilizing Taylor Vortex Flows, U.S. patent application Ser. No. 12/800,672 filed on 20 May 2010, now U.S. Pat. No. 7,972,747 issued on 5 Jul. 2011; and Dynamic Accelerated Reaction Batteries Utilizing Taylor Vortex Flows, U.S. patent application Ser. No. 12/800, 709 filed on 20 May 2010, now U.S. Pat. No. 7,064,301 issued on 21 Jun. 2011, with Philip M. & Daniel T. Lubin.

Some of these patent applications contain detailed descriptions of cells utilizing TVF and CCF to increase electrolyte convection that causes substantial increases in electrode current densities (e.g., $i/cm^2$ of projected electrode surface). However, there are galvanic battery applications where it would be advantageous to attain some of these benefits (e.g., high electrolyte convection fluxes) without requiring batteries to have rotating electrodes for inducing TVF or CCF. CFEB fill these needs and provide other advantages.

CFEB of this invention are galvanic cells configured to produce convection fluxes that are many times greater than migration, dispersion and diffusion fluxes of prior art batteries. This is accomplished by providing the CFEB with means for pumping electrolyte cross-flow from within a first electrode of one polarity across a dielectric gap into a second electrode of an opposite polarity and back into the first electrode. Because convection fluxes are prominent, CFEB can make advantageous use of electrodes with a thickness of at least 3,175 µm.

DARB U.S. Pat. No. 7,964,301 at Col 7, 1. 59-Col. 8, 1. 5 teaches means for pumping electrolyte through cross-flow electrodes in a TVF battery. One principal difference between CFEB and DARB is that CFEB do not require DARB's means for creating Taylor Vortex Flows in the electrolyte chamber electrolyte or means for creating Circular Couette Flows in the electrolyte chamber electrolyte. A second principal difference is that the '301 patent teaches electrodes having electrodes that are in the range of 100-1,000 µm, which are much thinner that CFEB electrodes that have electrodes with a thickness of at least 3,175 µm. A third principal difference is that DARB use cylindrical electrodes that decrease packing densities; whereas, CFEB can use cuboid electrodes that provide higher packing densities.

Cross-flow recirculation pumping produces high convection gradients and creates much larger ionic species velocities than can be obtained with conventional batteries. Higher species velocities lead to high electric current densities when compared to galvanic cells that are primarily dependent on migration, dispersion and diffusion forces for movement of ionic species.

Porous electrode cross-flow of electrolyte, at sufficient velocity provided by convection, can expand the width of the battery reaction zone to the full width of the bulk electrode. The expanded reaction zone, with its greater volume of reacting material, will generate a substantial increase in projected current; however, care must be taken to select electrode material with high electrical conductivity to carry the higher current (i) without excessive $i^2R$ heating power loss through electrode resistance (R). Electrode structures compatible with convection-flowing electrolyte and low electrical loss are disclosed below.

A principal benefit of this invention is its ability to provide much higher battery power density and improved energy utilization efficiency at a high C rate. Efficient performance at high C-rates for both the charge and discharge cycles is now practical for battery chemistries (e.g., the Edison Ni—Fe) that were uncompetitive because of low power density and slow recharge rates; but, have many desirable features such as low cost, resistance to abuse, large numbers of recharge cycles and benign environmental influence. While faradaic material molecular mass and packing density limit volumetric energy storage, that parametric figure of merit is somewhat improved because of the thick electrode packaging efficiencies of CFEB batteries.

As described above, inventors and authors have long recognized that anion and cation mobilities (whether by diffusion, dispersion, migration or convection) in electrolyte limit electrode current density. Accordingly, numerous solutions have been proposed, including use of pumps to force electrolyte alongside or through electrodes to increase ion mobility. However, none of these cells utilizes cross-flow pumping to increase ion mobility in batteries.

V. S. Bagotsky (Editor), *Fundamentals of Electrochemistry*, 2nd Edition, John Wiley, ISBN 13 978-0-471-70058-6, ©2006, §4.4 "Convective Transport", p. 61, presents Equation, (4.33), which provides an estimate of the . . . ratios of diffusion and maximum convective fluxes . . . . The author concludes:

It follows that the convective and diffusional transport are comparable even at the negligible linear velocity of $10^{-3}$ cm/s of the liquid flow. At larger velocities, convection will predominate.

Convection predominates in CFEB where it provides electrolyte flow through active porous electrodes at velocities in excess of 1 centimeter per second (cm/s). Therefore, the ionic mass transport from convection will be at least 1,000 times greater than ion mobility from diffusion in prior art static electrolyte batteries.

A principal reason that prior art cells and batteries have been unsuccessful in raising cell current density (e.g., $i/cm^2$) beyond the prior art electrical current limit of less than 1 Ampere/$cm^2$ by pumping electrolyte is that electrodynamics of conventional cells require that cations and anions move in opposite directions in order to satisfy mass-transfer balance requirements. CFEB of this invention comprise different structures and comprise pumps that satisfy mass-transfer balance requirements by propelling both cations and anions in the same direction through both electrodes.

This disclosure describes systems and methods for management of any type of fluid electrolyte in electrochemical cells and batteries. Cells and batteries of this invention have ionic conductivities that are orders of magnitude greater than prior art cells and batteries because ionic transfer times within and between electrodes, which have been a mass transport limitation of electrical-current-producing chemical reactions, now are negligible as a consequence of forced convective electrolyte flow.

The present invention is a robust cross-flow electrochemical battery for providing electrical energy to an electrical circuit comprising a first electrode that can be connected to the electrical circuit, a second electrode that can be connected to the electrical circuit, a dielectric gap interfaced between the electrodes and means for pumping electrolyte cross-flow through a cell. Those cross-flow pumping means enable a process including a step of pumping electrolyte cross-flow:

From within the first electrode,
Across the dielectric gap,
Into the second electrode, and
Back into the first electrode.

In CFEB of this invention, electrolyte moves in the same direction through both electrodes and the electrolyte gap. This structure and method facilitates the use of thick electrodes configured to collect and deliver electrons with very little ohmic loss and therefore produce exceptionally high projected current densities.

Because galvanic batteries store their energy in their electrode materials, the electrodes should be made as thick as practical. At least one of the electrodes should have a thickness in a direction orthogonal to the electrode-electrolyte gap interface of at least 3,175 µm. A recommended electrode thickness is in the range of 3,175-12,700 µm.

CFEB require porous electrodes to accommodate passage of electrolyte through them. Open cell porous structures with electrically conducting, porous scaffolds or substrates are preferred. These scaffolds or substrates usually are metal so they can serve as current collectors and have open pore dimensions, open volume fractions and solid material volume fractions that are substantially uniform throughout the bulk volume of each electrode. The electrically conducting scaffolds may be open cell metal foam that has smooth or jagged faradaic material surfaces. Pore topography may include mutually connected hollow pores resembling polyhedral structures with faces having open windows smaller than the pore diameters or characteristic internal dimensions (e.g., inscribed or circumscribed circles).

Electrode scaffold or substrate solid material volume fraction, relative to the geometric volume of the electrode as a whole or bulk volume, should be in the range of 3% to 20%. Thus, the porous scaffold current collectors have cell pores constituting 97% to 80% of the gross electrode volume so that faradaic material particles are secured within the pores and in electrical contact (i.e., circuit) with the current collectors. The faradaic materials may comprise particles having diameters typically in a range of 2 nanometers (nm) to 5 µm and the particles may be skeletal particles made from an alloy comprising an element that can be dissolved in a strong aqueous solution to produce jagged faradaic surfaces with high surface area-to-volume ratios. Electrically-conductive solid material (e.g., carbon nanotube filaments) extending from the pore surfaces and mixed or entangled with the faradic material particles can enhance electrical conductivity within the electrodes.

CFEB porous electrodes are different from porous electrodes used in electrolytic processes, which do not require faradaic materials (e.g., electrowinning) or in other types of batteries containing faradaic materials in their electrodes. With the possible exception of some porous lead-acid battery designs, electrode faradaic materials that participate in redox chemical reactions within common secondary battery electrodes are contained in a form (e.g., paste) that would not remain attached when immersed in flowing electrolyte.

CFEB electrode architecture and faradaic material morphology require open-cell matrix (e.g., scaffolds, foam) electrical current collectors that contain faradaic material particles or structures secured within their pores. As used here, a matrix is a porous, monolithic material that is continuous and interconnected so that generally there is a path between any two points in or on the matrix. An open-cell matrix contains unsealed pores that permit electrolyte to flow within the pores.

The faradaic materials must be in low-resistance electrical contact with the current collectors and secured so that the faradaic materials cannot be dislodged from the pores or become electrically isolated from the current collectors when electrolyte cross-flows through the porous electrode. Where sintering or similar processes are not practical, the faradaic materials can be retained by packing them tightly within the pores. Alternatively or additionally, conducting or dielectric filter elements capable of trapping particles can be used to enclose the electrodes.

Some prior art galvanic batteries (e.g., lithium-ion) use a membrane or a separator between electrodes to prevent a short-circuit—especially, when an electrode can grow a dendrite that would extend across an inter-electrode electrolyte gap to the other electrode. These membranes do not permit a free flow (e.g., cross-flow) of electrolyte across the electrolyte gap.

Prior art battery membranes are selective filters that must be permeable to at least one ion for the battery to function. However, the membranes must remain impermeable to faradaic materials, binders, pastes and other components that would impair the function of the separated electrodes if the components are allowed to cross between the electrodes. Because the membranes greatly retard mass transport of ions passing through the electrolyte gap by diffusion, dispersion and migration; ionic transport across the membrane is very much slower than the forced convective electrolyte cross-flow of this invention.

CFEB do not require use of a membrane or separator if faradic material particles cannot be flushed by cross-flowing electrolyte from the electrodes. Nevertheless, a membrane or separator can be useful in creating a laminate with contiguous electrodes that simplifies battery manufacture or provides mechanical strength to an electrode-pair assembly.

Because CFEB cross-flow of electrolyte only proceeds in one direction during a cycle, the separator does not need to be an ionic filter, and in various embodiments, the separator is not an ionic filter. The membrane may be any porous dielectric material that is highly permeable to the electrolyte flow and can be fluid-transparent to all electrolyte constituents so that none of the constituents (e.g., ions) are filtered out of the electrolyte.

CFEB with porous electrodes require fluid electrolytes. These electrolytes may be aqueous alkaline hydroxide solutions (e.g., KOH) or acid solutions (e.g., $H_xSO_y$, where there are at least three oxygen atoms per molecule).

Because electrolyte chemical variables change during CFEB usage, CFEB can comprise means for providing feedback control to adjust chemical variables in the electrolyte. The means for providing feedback control may include means for regulating the velocity of electrolyte flowing through an electrode in response to the magnitude of electrical current flowing in the electrical circuit.

CFEB can be built around a wide range of electrode-electrolyte chemistries. Examples include Edison-type batteries containing iron and nickel oxide-hydroxide electrodes with KOH electrolyte and lithium batteries containing a lithium electrode and an electrolyte that is a solvent (e.g., an organic liquid) containing a lithium salt.

When a conventional alkaline (either alkali or alkaline) electrolyte cell is discharged by connecting an electrical load to its electrodes, hydroxide anions ($OH^-$) move from cathode to anode while proton ($H^+$) cations forming water molecules are extracted from electrolyte, effectively moving in an opposite direction from anode to cathode. Pumping electrolyte in prior art cells can increase the mobility of one ion participating in a faradaic (also called galvanic) reaction; however, it will decrease mobility of another ion. Mass-transfer stoichiometric balance requirements and kinematics of the slower ion will limit electrode current density in a prior art cell.

By contrast in a discharging alkaline electrolyte CFEB cell, hydroxide ($OH^-$) anions and proton ($H^+$) cations will both be pumped in the same direction from a cathode toward an anode. However, the cations are bound to water in a neutral electrolyte external recirculation loop after passing through the porous anode and will reach the similarly porous cathode via a loop through the pump.

When electrolyte ions reach a cathode electrode, the ($H^+$) cations will reduce the cathode's metal oxide valence and decrease $H_2O$ in the electrolyte. The remaining ($OH^-$) anions will continue under convection, caused by the pump, across a dielectric or electrolyte gap to oxidize an anode's metal or intermetallic hydride. Where the anode comprises an intermetallic hydride, an amount of water equal to that lost at the cathode will be produced at the anode so that there will not be any net water loss in the process. Acid electrolyte chemistry (e.g., lead-acid) can be used in a CFEB by reversing the direction of cross-flow for ($H^+$) cations and water, which is added to electrolyte for discharge and consumed during recharge. Recharge for secondary batteries is greatly accelerated in CFEB.

Secondary CFEB cells can be charged by reversing the direction of electrolyte flow so that it is pumped from anode to cathode (alkaline electrolyte) or cathode to anode (acid electrolyte) and applying a charging current to the electrodes. However, there is no need to reverse flow to charge a Li-anode battery because $Li^+$ cations entering the rear of the anode will replenish the electrode. $Li^+$ cation flow is analogous to lead-acid $H^+$ cation discharge chemistry.

During recharge of an aqueous alkaline battery, anions will be released to the electrolyte from within the porous anode and flow across the electrolyte gap under forced convection as the anode's metal hydroxide or intermetallic alloy, M, is reduced to metal or MH, respectively. Cations will also be released from within the porous cathode as the cathode's metal is oxidized to a higher valence oxidation state and $H_2O$ is increased in the electrolyte to offset the discharging loss (described above) or balance the charging loss at the MH anode. As described above for discharging, there will not be any net change in electrolyte water concentration during charging if the anode comprises an intermetallic hydride.

In the case of metal-hydride battery chemistry, only the $H^+$ cation or proton moves rapidly in and out of the faradaic redox material of both electrodes. The essential $(OH)^-$ anion is pumped across the short path of an electrolyte gap between the electrodes. The $H^+$ cation is carried into the porous electrodes as a component of water molecules circulating in a closed loop.

Alkaline versions of CFEB described above contain alkaline electrolytes (e.g., KOH in Edison batteries or other electrolytes containing a hydroxide); however, the same principles and similar structures will work for acid electrolytes—especially those having at least three oxygen atoms per molecule (e.g., $H_2SO_4$ in lead-acid batteries). They will also work in lithium ion batteries where the cation is $(Li^+)$ coordinated with an anion salt in an organic solvent, as well as in molten carbonate and fuel cells where the electrolyte is a liquid.

It is therefore a first advantage of the present invention to provide a robust CFEB that provides greatly increased mass transport of ions by convection within the electrolyte and through porous electrodes.

A second advantage of the present invention is to provide a CFEB that uses incompressible forced convection—in addition to short path diffusion, dispersion or migration—as principal forces for promoting ion mobility.

A third advantage of the present invention is to provide a robust CFEB utilizing greatly increased active electrode areas exposed to flowing electrolytes in a compact cell volume.

A fourth advantage of the present invention is to provide a CFEB that does not have a tradeoff between electrode thickness and impedance.

A fifth advantage of this invention is to provide CFEB that create dynamic flows within electrolytes passing through open-cell, porous electrodes containing chemically active particles and surfaces to induce exceptionally high rates of mass transport to and from reduction-oxidation (redox) chemical reactions occurring at or on reactive surfaces.

A sixth advantage of this invention is to provide CFEB with low mass-transport-limiting and surface-limiting electrode characteristics and dynamic forced convective flow of electrolyte through electrodes that have very high surface area volumetric concentrations.

A seventh advantage of this invention is to provide electrode structures that collect and convey electrons associated with redox reactions in faradaic materials to battery terminals with exceptionally low ohmic loss.

An eighth advantage of this invention is to provide galvanic batteries that can use fluid-transparent separators instead of ion-selective membranes between electrodes.

These and other advantages of this invention are more fully set forth in the following description of a preferred embodiment of this invention.

BRIEF DESCRIPTIONS OF THE SEVERAL VIEWS OF THE DRAWINGS

FIG. 2A is a magnified view of a portion of FIG. 2 showing details of an anode and cathode separated by a dielectric or electrolyte gap.

FIG. 2B is a magnified view of a portion of FIG. 2 showing details of a cathode and anode in physical and electrical contact.

FIG. 3 is a graph of a typical nickel hydroxide particle to carbon filament mixing ratio.

FIG. 5 is a graph of cell charging current as a function of electrolyte flow rate of a Cross-Flow Electrochemical Battery having sintered nickel oxyhydroxide particles in its cathode and sintered iron particles in its anode.

DETAILED DESCRIPTION OF THE INVENTION

Cross-Flow Electrochemical Battery

First Embodiment

Figure 1A:
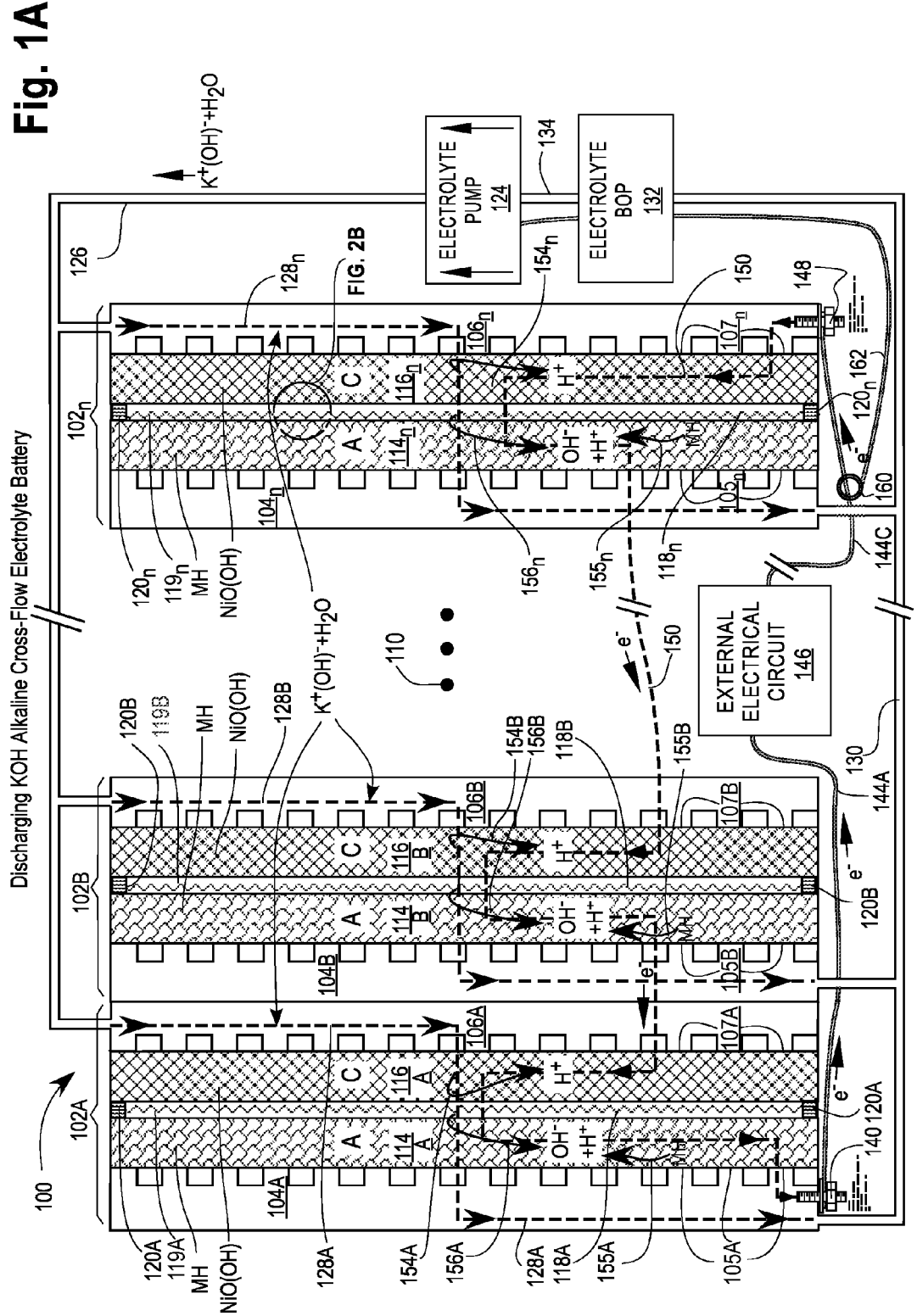
FIG. 1A is a cross-sectional view of a first preferred embodiment of a Cross-Flow Electrochemical Battery comprising a series of connected cross-flow cells with separate electrolyte chambers for each cell in discharging mode.
Figure 1B:
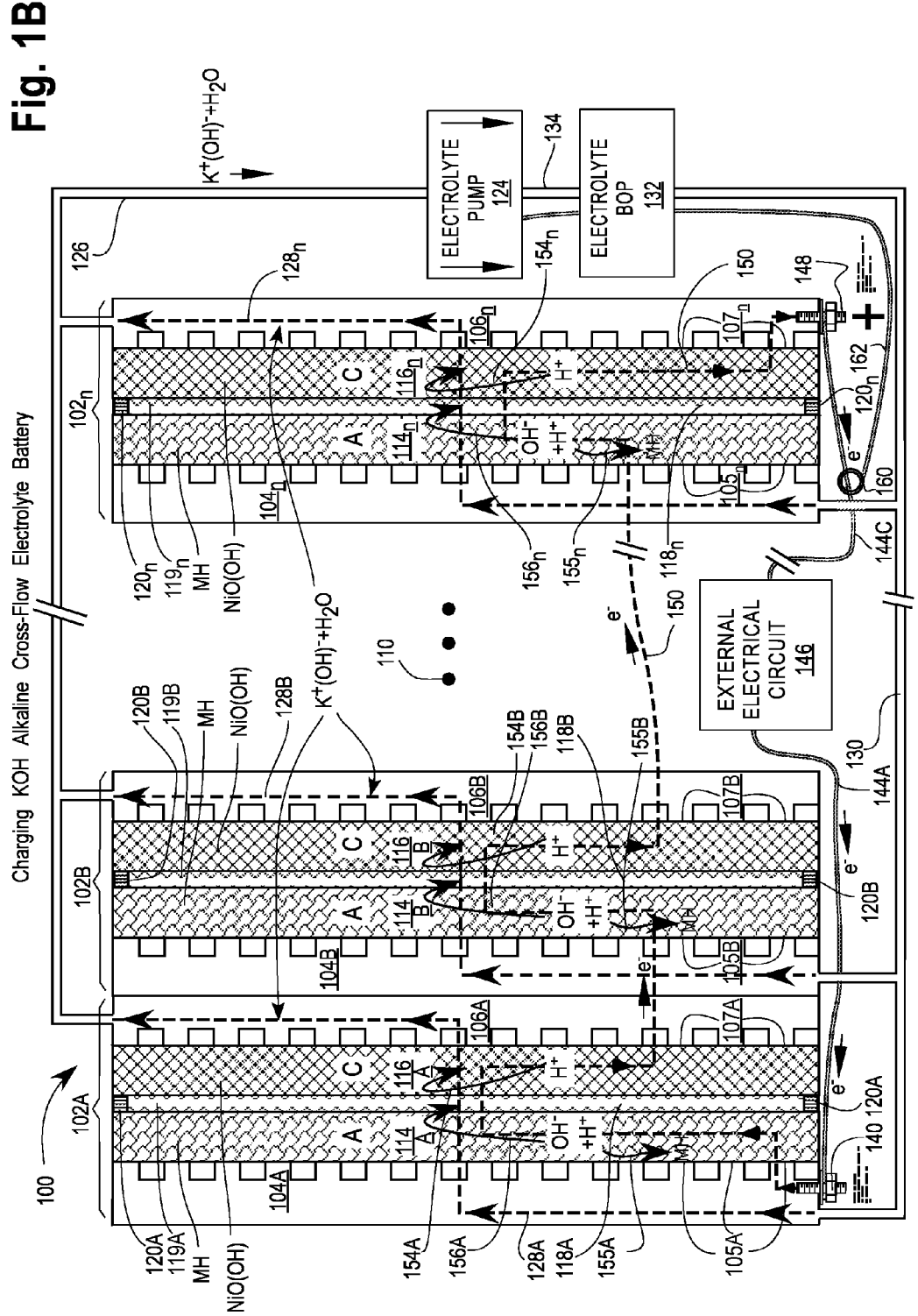
FIG. 1B is a cross-section view of the Cross-Flow Electrochemical Battery of FIG. 1A in charging mode.

FIGS. 1A and 1B are cross-sectional views of a first embodiment of a Cross-Flow Electrochemical Battery 100 comprising a series of connected cross-flow cells 102A, 102B, ..., $102_n$ with separate metal anode electrolyte chambers 104A, 104B, ..., $104_n$ having anode contact surfaces 105A, 105B, ..., $105_n$ and metal cathode electrolyte chambers 106A, 106B, ..., $106_n$ having cathode contact surfaces 107A, 107B, ..., $107n$ for each cell $102_x$, where $102_x$ may be any or all of the cells 102A, 102B, ..., $102_n$ and n is the Roman alphabetic character of the numerical equivalent of the last cell $102_n$ in the series (e.g., $_5$=E). Ellipsis 110 is a placeholder for additional cells 102C ... $102_{n-1}$, if any.

Each of the cells $102_x$ comprises an anode $114_x$—also labeled A—in electrical contact with its adjacent electrolyte chamber $104_x$ at the anode contact surfaces $105_x$; a cathode $116_x$—also labeled C—in electrical contact with its adjacent electrolyte chamber $106_x$ at the cathode contact surfaces $107_x$ and a dielectric or electrolyte gap $118_x$, which is located between the anode $114_x$ and the cathode $116_x$.

The electrolyte gap $118_x$ may be empty (except for electrolyte) or it may contain a membrane or separator $119_x$ that is highly (e.g., capable of at least 1 ml/sec/cm²) permeable to electrolyte cross-flow. The membrane or separator $119_x$ can be fluid-transparent to all electrolyte constituents as none of the constituents (e.g., ions) need to be filtered out of the electrolyte. The width of the gap $118_x$ is controlled by the thickness of gaskets $120_x$ made of electrically insulating material.

The anodes $114_x$ may comprise open cell porous structures containing intermetallic metal hydride compounds as faradaic materials. These are shown by the symbol MH and may be metals such as Fe, Cd and Zn, all in the form of highly dispersed small particles presenting very large exposed particle surface areas per unit of electrode cross-sectional area. The cross-sectional area is defined as the area of an electrode $114_x$, $116_x$ facing the electrolyte gap $118_x$. The cathodes $116_x$ may comprise similarly dispersed nickel oxyhydroxide particles or nanoflakes contained within an electrode structure similar to the anodes 114, and shown by the symbol NiO (OH). Electrode structures and faradaic material morphologies are described below. Electrolyte illustrated in the battery 100 is potassium hydroxide dissolved in water and designated by the symbol $K^+(OH)^-+H_2O$. Li(OH) may also be added to the electrolyte. These materials are well known in the prior art as constituents of nickel-metal hydride alkaline secondary batteries but not contained as described herein. The anodes $114_x$ and the cathodes $116_x$ are formed from metal meshes or open cell foams that are porous to the flow of electrolyte. An example of an electrode porous structure is described below in conjunction with FIGS. 4A, 4B, 4C and 4D.

An important feature of CFEB is their ability to use a thick, porous electrode with a wide reaction zone. This is an important improvement because batteries store their energy in their electrodes—as contrasted with flow cells that store their energy in their electrolyte or fuel cells that store their energy in their fuel. It is also important because prior art batteries incorporating so-called thick electrodes must use electrodes that are substantially thinner by at least an order of magnitude than electrodes incorporated in CFEB because thick electrodes impede ion diffusion and host narrow reaction zones.

For example, U.S. Pat. No. 7,348,101 to Gozdz et al for a Lithium Secondary Cell With High Charge And Discharge Rate Capability states at column 8, lines 6-32:

Surprisingly, Li-ion cells according to one or more embodiments of the present invention achieve high charge rates in cells having thick electrode layers, e.g., a positive electrode layer of about 50 μm to about 125 μm on one side of the current collector. While thicker electrode layers provide higher charge capacity, the thicker layers also typically increase the impedance of the electrodes (by, for example, increasing the distance and the tortuosity of the lithium diffusion pathway). In a single cell consisting of a positive and negative electrode in ionic contact with one another through the electrolyte, the areal charge capacity is one-half of the measured areal capacity for the double-sided electrode, e.g., at least 0.75 mA-hr/cm². It has been surprisingly discovered that a Li-ion cell having areal charge capacities of at least 0.75 mA-hr/cm², or 1.0 mA-h/cm² or 1.5 mA-hr/cm² are capable of high rate charge and discharge without plating lithium at the negative electrode.

A prior art method of obtaining a high charge and discharge rates is to reduce the areal capacity of the cell, e.g., by using very thin electrodes. A very thin electrode (i.e., with a low areal capacity) could achieve high charge and discharge capacity at high rates; however, the low mass/volume of the electrode in the cell would not result in a practical device. The cell according to one or more embodiments of the present invention provides both high rate capability AND high charge capacity.

By contrast, CFEB of this invention can use electrodes having thicknesses in the range of 3,175-12,700 μm (125-500 mils) or more, which is approximately 100-times thicker than taught by Gozdz et al. This is especially important for batteries because they store their energy in their electrodes where there is a need for improved energy packaging (volume storage) efficiency.

The Gozdz et al '101 patent clearly states that there is a tradeoff between current capacity and electrode impedance because of increasing the distance and the tortuosity of the lithium diffusion pathway. Since CFEB utilize convection forces, rather than diffusion pathway forces, as their principal inter-electrode ion mobility forces, CEFCB do not require the Gozdz et al tradeoff of energy capacity versus charging/discharging current; provided however, that internal electrode structural electrical resistance is sufficiently low to limit $i^2R$ electric power losses. The most immediate practical advantage of higher current capacity is greater C-rates and improved energy and power density per unit volume over prior art batteries.

In order to obtain the high current density benefit of convection-driven ion mobility, electrode structures must have very little ohmic resistance. Porous metal electrodes with open cell structures having fractional-micron (μm or micrometer) pores can be readily fabricated. Highly conducting open cell matrix scaffolds or substrates with significant open volumetric pore volume can hold a substantial amount of faradaic material in particulate form.

Faradaic materials generally used in secondary batteries comprise particles that will exchange ions with electrolyte and electrons with conductors. These particles can be relatively poor electrical conductors—especially if they are not physically attached as a unitary structure to one another and a supporting metal scaffold. If each particle is completely enclosed by electrolyte, which does not conduct electrons, then the entire assemblage of particles within a pore can offer very considerable resistance to electron flow. As further described hereinafter, several structural alternatives are offered that will provide low electrical resistance.

FIG. 1A shows electrolyte flow for discharging a first embodiment of a KOH alkaline electrolyte CFEB 100. Electrolyte flow may be considered as starting at electrolyte pump 124, where arrows show the direction of flow. Electrolyte flows from the pump 124 through electrolyte conduit 126 that is in fluid communication with cathode electrolyte chambers $106_x$.

Electrolyte in cathode electrolyte chambers $106x$ is evenly dispersed along the walls of the cathodes $116_x$. The electrolyte flows along paths (one path in each cell $102_x$ highlighted by dashed line $128_x$) within the porous cathodes $116_x$ and then across the dielectric or electrolyte gap $118_x$ and into the porous anodes $114_x$.

Electrolyte exiting the porous anodes $114_x$ then enters the anode electrolyte chambers $104_x$. The anode electrolyte chambers $104_x$ are connected to electrolyte conduit 130, which is in fluid communication with electrolyte balance of plant (BOP) 132. The BOP 132 may be used to remove heat and precipitates or other contaminants from the electrolyte. The BOP 132 also can adjust electrolyte molarity and fluid volume to relieve internal battery mechanical stress associated with chemical reactions in accordance with electrical energy demands placed upon the battery 100. Use of the electrolyte BOP 132 is optional. Electrolyte from BOP 132 is returned to the electrolyte pump 124 through electrolyte conduit 134 and completes a closed fluid circuit.

In addition to the closed fluid circuit that has just been described, the CFEB 100 comprises an electrical circuit that will be described as beginning at the anode contact surfaces 105A and continuing through the anode electrolyte chamber 104A to anode terminal 140 and then through conductor 144A, external electrical circuit 146, conductor 144C to cathode terminal 148, the cathode electrolyte chamber $106_n$ to the cathode contact surfaces $107_n$. The direction of electron flow in the conductors 144A, 144C is shown by arrows adjacent to the symbols $e^-$.

The electrical circuit within the CFEB 100 may be traced from the cathode terminal 148 along electric current flow dashed line 150. The electric current continues its flow through the cathode $116_n$, across the dielectric or electrolyte gap $118_n$, as an anion into the anode $114_n$ and then through the anode electrolyte chamber $104_n$, which is an electrically-conducting metal.

The electrical current then continues along dashed line 150 through the next cathode electrolyte chamber 106$_x$ (shown in FIG. 1A as 106B), which is also an electrically conducting metal. The cathode electrolyte chamber 106$_x$ is in electrical contact with its adjacent cathode 116$_x$ (shown in FIG. 1A as 116B).

As shown in FIG. 1A, an anode electrolyte chamber 104$_x$ is electrically connected to an adjacent cathode electrolyte chamber 106$_{x-1}$ (shown in FIG. 1A as anode electrolyte chamber 104B connected to cathode electrolyte chamber 106A). This structure enables the electrical current to flow through cells 102B and 102A to return to the anode terminal 140 and thus complete the battery 100 electrical circuit.

As described above, ion mobility in prior art batteries depends on differences in electrode potentials that establish concentration gradients in the electrolyte that cause ions to migrate disperse and diffuse. These processes are relatively slow and therefore limit battery current. By contrast, the CFEB 100 utilizes convection induced by the electrolyte pump 124 to propel ions across the electrolyte gap 118$_x$ of each cell 102$_x$. Convection velocities are orders of magnitude greater than migration, dispersion and diffusion velocities. As a consequence ionic mass transport in electrolyte is greatly increased both between electrodes and at chemically reactive faradaic particle surfaces of the active electrode material.

CFEB incorporating iron and nickel oxide-hydroxide electrodes will out-perform conventional Edison batteries in both discharge and charge cycle kC-rates and C'/C ratios as previously defined. Other materials besides metal hydrides and nickel oxyhydroxide described above can be used in CFEB. For example, lithium-ion batteries using (e.g., LiC$_6$ or Li$_4$Ti$_5$O$_{12}$ anodes 114$_x$, LiFePO$_4$ or LiNi$_{0.5}$Mn$_{1.5}$O$_4$ cathodes 116$_x$ and organic carbonate solutions of lithium anion salts such as LiPF$_6$, LiAsF$_6$, LiClO$_4$, LiBF$_4$, or LiCF$_3$SO$_3$) can also be used without departing from the spirit of this invention. The anode 104$_x$ metal may comprise zero-valence lithium metal intercalated within a molecular structure of carbon particles in the form of graphite or a non-carbon molecular structure such as titanate. Its redox mechanism is chemically different from the water-based alkaline examples; but, its ionic mass transport still depends on porous electrodes and electrolyte cross-flow described here.

Li$^+$+e$^-$ ↔ Li is the most electronegative couple among the metals at −3.045 volts (Bagotsky at p. 44). The couple favors oxidative creation of cations for battery discharge; provided, the ion does not accumulate within the anode. Circulation of the neutral electrolyte in the external conduit 126 through the pump 124 will prevent cation accumulation in the porous cross-flow anode by forcing these ions to cross the electrode gap and become intercalated with the cathode lithium spinel structure that reduces one or more of the metals of that spinel.

Flow of Li$^+$ cations with electrolyte from anode to cathode under discharge is analogous to flow of H$^+$ cations in the lead-acid or alkaline (OH)$^-$ anions, from cathode to anode, in the aqueous alkaline examples previously described. Excess Li$^+$ cations are extracted from circulating electrolyte at the cathode during discharge prior to electrolyte return to the anode through the external loop.

In the alkaline aqueous example, charging requires reversal of the direction of these coordinated flows; but, in the case of lithium, flow is not reversed for charging because that would amount to plating Li directly back into the anode under the influence of an electric field between electrodes. The latter charging method is the only one available to current art Li-ion batteries and leads to formation of dendrites and a potentially unstable solid electrolyte interphase layer, both of which degrade battery performance and durability. In the special case of lithium-ion CFEB, cross-flow is not reversed when charging voltage is applied. Instead, cross-flow in lithium batteries during both discharging and charging always proceeds from within the anode 114$_x$ (first electrode) across the dielectric gap 118$_x$ into the cathode 116$_x$ (second electrode) and back into the anode 118$_x$ (first electrode).

Charging voltage causes excess Li$^+$ cations to be deposited into the electrolyte within the thick porous cathode prior to electrolyte return to the anode through an external loop but, not directly across the electrode gap path taken previously during discharge. Cross-flow convection flux completely overwhelms both the concentration gradient and the electric field driven by diffusion.

Electrodeposition of Li$^+$ to Li throughout the interior porous anode structure without crossing the applied electric field is unique to this invention. The anode 104$_x$ is a working, porous flow-through electrode containing an electronegative EDL, while the cathode serves as a reference electrode. The recirculating path delivers Li$^+$ in a manner analogous to supplying H$^+$ ions as part of a component of a neutral water molecule to a discharging cathode in the previously described continuous loop for aqueous alkaline chemistry.

For Li-ion cells, Li$^+$ cation plating occurs uniformly within the porous structure of the anode where there is no detectable electric field strength. This feature distinguishes CFEB from conventional Li-anode batteries where Li plates onto anode surfaces exposed to electric fields and forms dendrites or other obstructive coatings that can short-circuit a cell. Further, convectional flow within the anodes charges an electronic double layer (EDL) within the porous electrode to provide supercapacitor electric field energy storage.

When alkaline electrolyte contacts a cathode 116$_x$, a cation (here a proton H$^+$ coordinated with OH$^-$ as a water molecule) travels a path shown by arrows 154$_x$ from the electrolyte flow into the cathode to cause a metal (here, the nickel in nickel oxyhydroxide) to be reduced. In this example, the reactions at the cathodes 116$_x$ and anodes 114$_x$ can be expressed as:

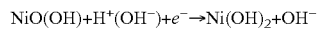
NiO(OH)+H$^+$(OH$^-$)+$e^-$→Ni(OH)$_2$+OH$^-$

The hydroxide ion, OH$^-$ that has been liberated must travel to the anode electrode 114$_x$ in order to oxidize its metal or metal hydride in a reaction that can be expressed as:

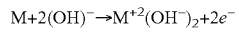
M+2(OH)$^-$→M$^{+2}$(OH$^-$)$_2$+2$e^-$ or:

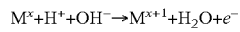
M$^x$+H$^+$+OH$^-$→M$^{x+1}$+H$_2$O+$e^-$

The protons (H$^+$) are provided by the metal hydride as shown by arrows 155$_x$, which begin with the symbols MH to signify that the sources are the metal hydrides of the anodes 114$_x$. The hydroxide anion (OH$^-$) travels a path in the electrolyte as shown by arrows 156$_x$.

In prior art batteries, the OH$^-$ anions created in a concentration gradient driven diffusion exchange with water at the surfaces of cathode particles must travel through thin electrode mixtures of particles, conducting material and paste binder (used to secure the faradaic material particles within the pores) and across an electrolyte gap propelled only by a weak electric field and relatively slow migration and diffusion forces. In the cells 102$_x$ of the CFEB 100, the reactions are different for four reasons; namely:

First, there is enhanced cathode release of OH$^-$ anions into a flowing electrolyte laminar boundary layer that has been somewhat depleted in OH$^-$ anions by a previously encountered anode. The nominal concentration is 2 to 4-molar KOH, plus 1 molar LiOH in some cases. Electrolyte flow dynamics within electrode structures are described below.

Second, the OH⁻ anions previously released have been accelerated by convection forces, not found in prior art batteries, through the anodes $114_x$ where they are absorbed so that the effective OH⁻ anion transit times across the dielectric or electrolyte gaps $118_x$ approach zero.

Third, both electrolyte flow and anion OH⁻ flow (shown by dashed lines $128_x$ and arrows $156_x$) and electron flow (shown by dashed line 150) are in the same direction through the cells $102_x$ for an alkaline electrolyte.

Fourth, electrons readily pass from finely divided faradaic particle surfaces to attached current collector materials. The latter may also be attached directly to highly conducting metal scaffold.

Therefore, the maximum charge and discharge currents of a CFEB 100 are orders of magnitude greater than that of prior art batteries—including those that incorporate electrolyte pumps; but, do not utilize the cross-flow electrolyte technology optimized for convection flow of ions as disclosed here. These structures are an essential feature of the balanced approach to ion and electron conduction of this invention.

The description provided above applies to alkaline electrolyte cells. Where acid electrolyte or lithium cells are employed, then the electron flow (shown by dashed line 150) is in the opposite direction of the electrolyte flow (shown by dashed lines $128_x$ and arrows $156_x$) through the cells 102.

The merits of CFEB of this invention can be evaluated by relating cross-flow ionic current to electrical current. Ionic diffusion factors are negligible for the flow rates described here. The electrolyte volumetric flow-per-cm² of projected electrode cross-section is a velocity, v, which can, as an example, be assumed to be 1 cm/s. An electrode cross-section of 100 cm² requires 6 LPM of electrolyte flow. The formula, $m=1000(i/vF)$, where m is the molar excess concentration of univalent ions (e.g., OH⁻) that must be flowing between electrodes, i is the electrical current, v is the electrolyte flow velocity and F is the Faraday Constant. Even where i=10 amps/cm², molarity equates to little more than 0.1 molar of extra ions at v=1 cm/s in an electrolyte concentration of 4 to 5 molar of similar ions.

The flow of 0.1 molar excess ion concentration corresponds to an ion production rate of $6.24 \times 10^{19}$ ions/ml-sec. Therefore, volumetric flow rates provided by CFEB will cause a substantial increase in chemical reaction surface activity. This can be seen through use of experimental data in Ma et al, *High Rate Micrometer Ordered $LiNi_{0.5}Mn_{1.5}O_4$*, J. Electrochemical Society 157 (8), pp. A925-A931 (August 2010). The following quotations from that paper provide a background for the improvements first made possible by this invention:

Johns et al. showed that Li-ion transport in an electrolyte especially through the composite electrode can be rate limiting at high rates [of current density]. (11. 231-233)

. . .

These increases in rate capability observed when diluting the active mass with more carbon are similar to what has been observed in $LiFePO_4$ and point to the electrode morphology being rate-limiting for very fast electrode materials. (11. 242-245)

CFEB address these issues with an unprecedented efficiency that far surpasses Ma's suggested improvements, as the following example will show.

Although Ma et al first used approximately 3 to 4 mg/cm² of 3 to 5 µm diameter ordered lithium spinel particles in 15% carbon black and 5% PTFE binder, their highest current density was obtained with 30% Li and 65% carbon black to carry the higher current. That led to their comment pertaining to difficulties with electrode morphology. In all cases, the discharge rate, 1 C, was defined as 150 mA/g and the highest measured discharge capacity is reported to be 167 C (78 mAh/g) with good retention of general performance. (11. 235-245) The lower Li loading factor is approximately 1.3 mg/cm² so 1 C is 0.2 mA/cm² and 167 C discharge current is 33 mA/cm². Using an average spinel particle density of 3.8 mg/cm³ and mean particle size of 4 µm, the stated results were accomplished with $10^7$ particles/cm² in a thin paste electrode.

CFEB electrodes hold approximately $0.764/D^3$ particles/cm³ (where D=average particle diameter) or about $0.191/D^3$ particles/cm² in, for example, a 6,350 µm (¼ inch) thick electrode, Such an electrode would contain $3 \times 10^9$ particles at least as chemically active at the 167 C discharge rate described by Ma et al. Consequently, the operative current density with the thicker electrode would be $3 \times 10^2$ higher or 10 amps/cm². This exceptionally high current density is based upon the stated performance of the lithium particles described in Ma et al, ionic mass transport rates described above and low current collection impedance made possible by porous electrode structure design more fully described below.

A further example using nickel-based chemistry illustrates the energy density attainable with thick electrode structures. Energy storage is proportional to the molar density of Ni in the cathode which is the primary factor that limits total battery energy density. A thick cathode has about 88% of open pore volume available for filling with faradaic NiOOH or $Ni(OH)_2$ particles. The remaining 12% of the electrode volume is Ni scaffold that is needed as an electric current collector.

The discharged hydroxide particles require the most volume. A solid particle has a density of 4.1 gm/ml. Whether in the form of nanoflakes or particles, $Ni(OH)_2$ as faradaic material within a porous electrode, has an optimum porous density for electrolyte cross-flow purposes of 2.665 gm/ml. Because 63.32 wt. % of hydroxide molecules is nickel, net nickel density is 1.7 gm/ml or 0.02875 mole/ml of available open volume, which is about 0.0253 mole/ml in relation to total cathode volume. However, all of the available nickel participates in the redox reaction because of its highly dispersed material structure. Consequently, the Amp-hr rating is given by MF/3600 where M is the molar concentration and F is the Faraday constant of 96,485 coulomb/mole. Thus, the example cathode can provide a charge of about 0.678 A-hr/ml. A counter-anode stoichiometrically loaded with Fe or MH requires less than half that volume. Therefore, a reasonable estimate of total cell charge rating would be about 452 A-hr/liter. At a conservative 1.1 volt output, the CFEB example has a conservative energy storage density of about ½ kW-hr/liter.

FIG. 1A illustrates a CFEB 100 incorporating cells 102A, 102B, . . . , $102_n$. The only limitation is $n \geq 1$. The output voltage of the CFEB 100 appearing across terminals 140 and 148 will be the product of n times voltage of a single cell $102_x$ before reduction for internal $i^2R$ losses.

FIG. 1A also illustrates optional means for providing feedback control to CFEB 100. In the illustrated embodiment, these means comprise a current-sensing coil 160 surrounding the conductor 144 for the purpose of generating an electrical signal having magnitude that is a function of the magnitude and direction of the electrical current flowing in the conductor 144.

Signals from the coil 160 are optionally transmitted by signal cable 162 to the electrolyte BOP 132 so electrolyte molarity and other chemical variables can be adjusted quickly in response to changes in electrical load. Also, the signal cable can be connected to the pump 124 to control its output flow for regulating the velocity of electrolyte flowing through an electrode $114_x$, $116_x$ in response to the magnitude of electrical current flowing in the electrical circuit 146.

FIG. 1B illustrates the same CFEB 100 that is illustrated in FIG. 1A. The only difference is that FIG. 1A shows electrolyte flows and electrical current flows for the battery discharging mode; whereas, FIG. 1B shows the battery flows in the charging mode where the external electrical circuit 146 is a source of electrical energy.

The charging mode of the CFEB 100 is the reverse of the discharging mode. When the CFEB 100 is placed in the charging mode, the direction of electron flow, as shown by the arrows accompanying the symbols e⁻ and the output direction of the electrolyte pump 124 are reversed from those shown in FIG. 1A. The same is true for the arrows for the electrolyte dashed lines $128_x$, the electric current flow dashed line 150, the cation (H⁺) and the anion (OH⁻).

Typical metal hydride formulae for the cathode and anode chemical reactions during charging are:

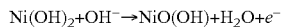

$$Ni(OH)_2 + OH^- \rightarrow NiO(OH) + H_2O + e^-$$

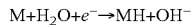

$$M + H_2O + e^- \rightarrow MH + OH^-$$

Charging reduces the metal hydride MH in the anodes $114_x$ by returning protons (H+) to the metal hydride as shown by the arrows $155_x$, which terminate with the symbols MH to signify that the sinks are the metal hydrides of the anodes $114_x$. The charging voltage applied across terminals 140 and 148 must exceed the open-circuit voltage of a cross-flow cell $102_x$ times n plus an increase for internal i²R losses.

An analogous process for conventional Li-ion batteries is described by A. Domenech-Carbo in *Electrochemistry of Porous Materials*, CRC Press © 2010, page 234 as:

> The charging and discharging processes of lithium batteries involve the transfer of Li⁺ from one electrode to another. This process can be regarded as a topotactic intercalation reaction of Li⁺ ions into interstitial sites on the crystalline host matrices, eventually accompanied by first-order phase transitions. Electrochemical detection of such phase transitions is conditioned by slow solid-state diffusion of ions into the solid matric and uncompensated ohmic drops.

By contrast in CFEB 100, such Li⁺ mass transport is neither diffusion-rate limited with respect to the transfer of Li⁺ from one electrode to another nor at the electrolyte solid-state interface. It occurs under energetic forced convective cross-flow in thick porous electrodes $114_x$, $116_x$ and across short and highly permeable intercalation paths where reaction rates can respond rapidly to sudden load changes.

FIG. 10.12 of Domenech-Carbo (Id.), illustrates a prior art lithium battery having thick, porous electrodes and shows the advance of a moving boundary during the electrochemical conversion of $LiC_{12}$ into $LiC_6$ following the description of Levi and Aurbach (2007). This describes a process limited by concentration gradient diffusion (Fick's Law) in the absence of an electric field that cannot exist within a porous metal structure. If the faradaic material is connected to the supporting metal scaffold through a low impedance pathway and the intercalation material exchanges cations efficiently, as many do, then the illustrated rate limiting process clearly is the advance of a moving boundary. The CFEB 100 eliminates the boundary and exposes the entire electrode (i.e., every faradaic particle within every pore) to the electrochemical conversion process almost simultaneously. This is an important feature of the CFEB 100.

Just as the CFEB 100 can provide a higher discharging current than prior art batteries of similar size and chemistry, the CFEB 100 can also accept a higher charging current than prior art batteries. This capability means that it can be recharged in minutes—instead of hours—providing that the charging circuit can provide sufficient electrical current.

Cross-Flow Electrochemical Battery

Second Embodiment

Figure 2:
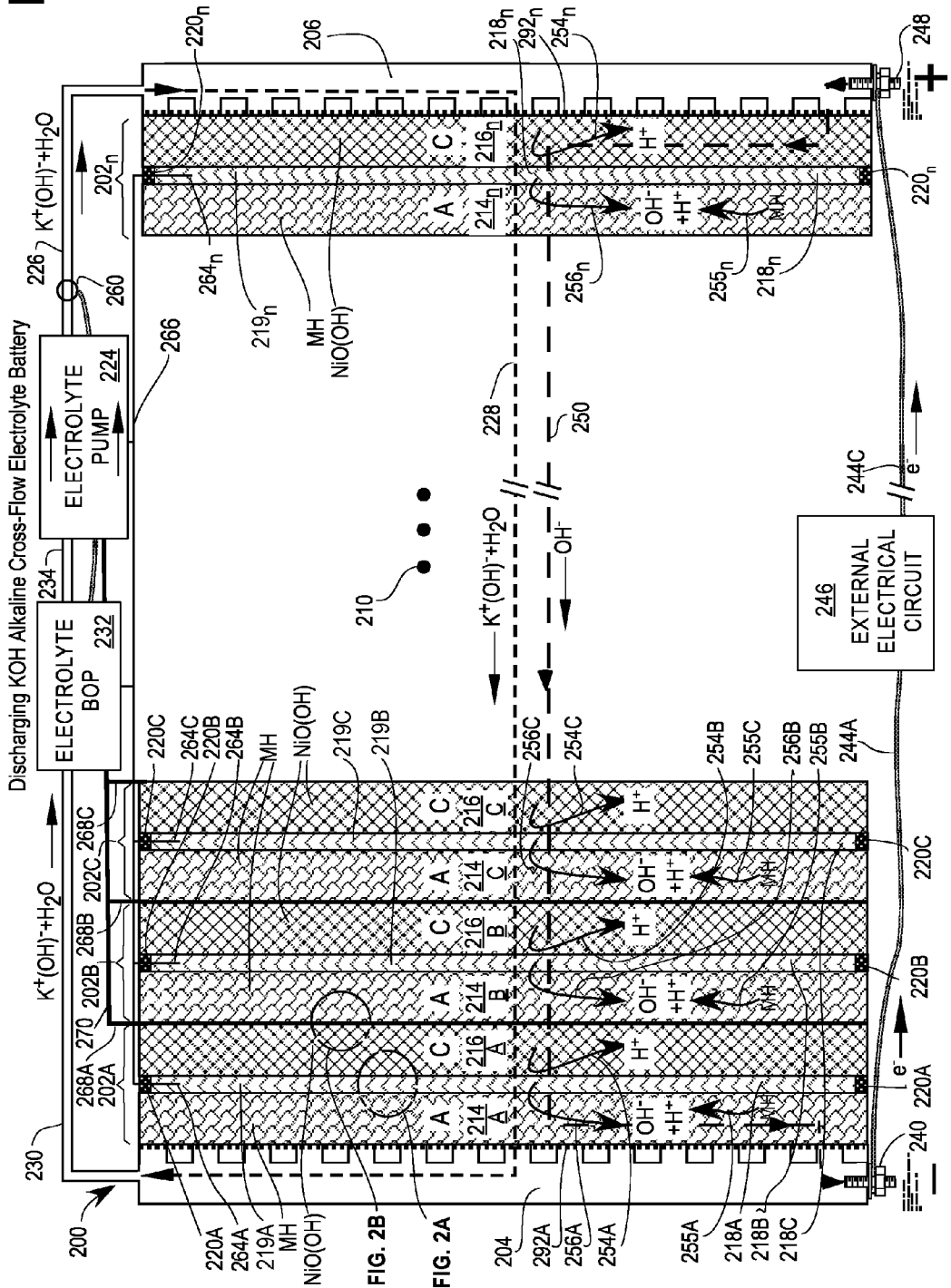
FIG. 2 is a cross-section view of a Cross-Flow Electrochemical Battery comprising a series of connected cross-flow cells with a common electrolyte chamber for all cells in discharging mode.

FIG. 2 is cross-sectional view of a second embodiment of a Cross-Flow Electrochemical Battery 200. This is a special-purpose configuration that may be preferred where energy or power density per size or weight must be maximized or the CFEB 200 need only be charged and discharged once or stored in a discharged state for rapid recharge and immediate reuse. Most of manifold hardware bulk and mass found in the first embodiment has been eliminated to reduce size and weight. The second embodiment can be stored for long periods in a stable, discharged condition and quickly charged for use. The battery's limitation is that once its external electrical source or load is removed or pumping is stopped, the battery will self-discharge. In use, self-discharge is prevented by electrolyte cross-flow.

The CFEB 200 comprises a series of connected cross-flow cells 202A, 202B, 202C, . . . , $202_n$. Instead of separate electrolyte chambers for each cell as incorporated in CFEB 100 of the first embodiment, the battery 200 contains a single metal anode electrolyte chamber 204 adjacent to and in electrical contact with cell 202A and a single metal cathode electrolyte chamber 206 adjacent to and in electrical contact with the cell $202_n$. Ellipsis 210 is a placeholder for additional cells 202D . . . $202_{n-1}$, if any. Each of the cells $202_x$ comprises an anode $214_x$—also labeled A, a cathode $216_x$—also labeled C, and a dielectric or electrolyte gap $218_x$, which is located between anode $214_x$ and cathode $216_x$.

The electrolyte gap $218_x$ may be empty (except for electrolyte) or it may contain a membrane or separator $219_x$ that is highly permeable to electrolyte cross-flow. The membrane or separator $219_x$ can be fluid-transparent to all electrolyte constituents as none of the constituents (e.g., ions) need to be filtered out of the electrolyte. The width of the gap $218_x$ is controlled by the thickness of gaskets $220_x$ or porous membrane in the gap $218_x$—both of which are made of electrically insulating material.

As for the first CFEB 100 embodiment, the anodes $214_x$ may comprise metal hydride, as shown by the symbol MH. The anode 214A is in electrical contact with the anode electrolyte chamber 204. The cathodes $216_x$ may comprise nickel oxyhydroxide, as shown by the symbol NiO(OH). The cathode $216_x$ is in electrical contact with the cathode electrolyte chamber 206.

Electrolyte used in the battery 200 is potassium hydroxide dissolved in water and designated by the symbol K⁺(OH)⁻+ $H_2O$. Li(OH) may also be added to the electrolyte. Other materials (e.g., lithium-ion batteries) can also be used without departing from the spirit of this invention.

The anodes $214_x$ and the cathodes $216_x$ can be formed from metal meshes or foams that are porous to the flow of electrolyte and are similar to the anodes $114_x$ and cathodes $116_x$ of the first embodiment. The differences are located on the faces of the electrodes where anodes and cathodes come into contact. These will be described later in conjunction with FIGS. 2A & 2B.

FIG. 2 shows electrolyte flow for discharging the second embodiment of a KOH alkaline electrolyte CFEB 200. Electrolyte flow may be considered as starting at electrolyte pump 224, where the arrows show the direction of flow. Electrolyte flows from the pump 224 through electrolyte conduit 226 that is in fluid communication with the cathode electrode chamber 206.

Electrolyte flowing through the conduit 226 next enters the cathode electrolyte chambers 206, where it is evenly dispersed along the wall of the cathode 216. The electrolyte flows along a paths (one path in each cell $202_x$ highlighted by dashed line 228) from within the porous cathode $216_n$ and then across the dielectric or electrolyte gap $218_n$ and into the porous anode $214_n$.

Electrolyte exiting the porous anode $214_n$ then enters an adjacent cathode, which in this case is 216C. The electrolyte flow—as shown by dashed line 228—then passes through cathode 216C, gap 218C, anode 214C, cathode 216B, gap 218B, anode 214B, cathode 216A, gap 218A anode 214A and into anode electrolyte chamber 204. The anode electrolyte chamber 204 is connected to electrolyte conduit 230, which is in fluid communication with electrolyte BOP 232. As in the case of the first embodiment, BOP 232 is used to adjust electrolyte molarity and volume in accordance with electrical energy demands placed upon the battery 200. The BOP 232 also can remove precipitates or other contaminants from the electrolyte. Use of the electrolyte BOP 232 is optional. Electrolyte from BOP 232 is returned to the electrolyte pump 224 through electrolyte conduit 234 and completes a closed fluid circuit.

In addition to the closed electrolyte fluid circuit that has just been described, the battery 200 comprises part of a closed electrical circuit that begins at the anode 214A and continues through the anode electrolyte chamber 204 to anode (−) terminal 240 of cell 202A and continues externally via conductor 244A, external electrical circuit 246, conductor 244C, cathode (+) terminal 248 of cell $202_n$ and the cathode electrolyte chamber 206 to the cathode $216_n$ of the cell 202.

The electrical circuit within the battery 200 may be traced from the cathode terminal 248 along electric current flow dashed line 250. The electric current continues its flow through the cathode $216_n$, across the dielectric or electrolyte gap $218_n$ as ionic mass transport, into the anode $214_n$. From there, the electric current flow dashed line continues through cathode 216C, gap 218C, anode 214C, cathode 216B, gap 218B, anode 214B, cathode 216A, gap 218A and anode 214A back to the anode terminal 240.

As explained in the description of the first CFEB 100 embodiment of FIGS. 1A, 1B, when alkaline electrolyte contacts cathodes $216_x$, cations (here protons $H^+$) travel paths shown by arrows $254_x$ from the electrolyte flow into the cathodes $216_x$ to cause metal (e.g., nickel in nickel oxyhydroxide) to be reduced. Protons ($H^+$) are provided by the metal hydride as shown by the arrows $255_x$. Hydroxide anions ($OH^-$) travel a path shown by arrows $256_x$ to the anode $214_x$ in the manner previously described for the first CFEB 100 embodiment to promote oxidation reactions.

The direction of electron flow in the conductors 244 and along the electric current flow dashed line is shown by arrows adjacent to the symbols $e^-$. When the CFEB 200 is being charged by the external electrical circuit 246, the external electrical circuit 246 becomes a source and the direction of electron flow is reversed. The direction of electrolyte flow is also reversed; except, when Li is used for an anode—as explained above.

Both CFEB first 100 and second 200 embodiments comprise electrically series connected battery unit cells. The former allows separate electrolyte cross-flow through each unit cell 102A, 102B, . . . $102_n$ so that electrolyte molarity, both entering and leaving each unit cell is identical among the cells whether or not molarity is changed within the cell.

The CFEB 200 of FIG. 2 may allow molarity in the cell where electrolyte exits to be somewhat different from entering molarity. This would not be the case for metal hydride or Li-ion reactions because there is no net alteration of electrolyte molarity for either of these complete unit cell reactions. However, in other alkaline or acid electrolyte reactions water is either consumed (discharge) or produced (charging) within each unit cell.

Each cell 202A, 202B, . . . , $202_n$ adds a voltage increment; but, the water balance is mainly determined by current density. In a previous calculation it was noted that current as high as 10 amps/cm$^2$ produced only 0.1 molar change in ion concentration for each voltage step per unit cell. However, 10 or 15 such steps could potentially alter the chemistry and current production as electrolyte progresses through the battery. A simple calculation shows that 10 such steps could take a 23% or 5 molar alkaline solution to 29% or 6.4 molar. There is still plenty of water to support most reactions; but, the choice should be based upon specific applications.

FIG. 2 also illustrates three optional means for providing feedback control to CFEB 200. Feedback control signals are transmitted to the electrolyte BOP 232 so that it can promptly adjust electrolyte molarity and other chemical variables quickly in response to changes in electrical load. Also optionally, the feedback control signals can be connected to the pump 224 to regulate its output flow in response to the magnitude of the discharging or charging electrical current flowing in the electrical circuit 246.

A first means for providing feedback control to CFEB 200 comprise a current-sensing coil 260 surrounding the conductor 226 for the purpose of generating an electrical signal having magnitude that is a function of the magnitude and direction of the electrical current flowing in the conductor 226. Signals from the coil 260 are optionally transmitted on signal cable 262 to the BOP 232 and pump 224.

A second means for providing feedback control to CFEB 200 comprise electrolyte probes $264_x$ inserted in each of the electrolyte chambers $218_x$ to measure cell voltage, electrolyte pH, electrolyte temperature, electrolyte pressure and other cell variables of interest. These data are transmitted over signal cable 266 as feedback control signals to the BOP 232 and to the pump 224.

A third means for providing feedback control to CFEB 200 comprise voltage probes $268_x$ inserted in each of cathode $216_x$—anode $214_x$ junction. These voltage data are transmitted over signal cable 270 as feedback control signals to the BOP 232 and to the pump 224.

FIG. 2 illustrates a rectilinear version of the second embodiment of a CFEB. It is also practical to build multi-cell batteries in a cylindrical configuration comprising a series of nested cylindrical cells having one electrolyte chamber at the battery's center and the other electrolyte chamber surrounding the largest cell.

Electrodes

In order to avoid confusion below in identification of electrode polarities, a negative electrode is defined as an anode because it is a source of electrons and a positive electrode is defined as a cathode because it is a sink of electrons received through an external load during discharge. Charging at voltages exceeding the natural open circuit voltage (OCV) of a cell reverses electrical current direction; but, not the electrode polarity definition.

In CFEB 100, 200, the anodes $114_x$, $214_x$ and the cathodes $116_x$, $216_x$ employ an open cell porous structures defining electrically conducting, porous scaffolds or substrates. These scaffolds or substrate usually are metal and have open pore dimensions, open volume fractions and solid material volume fractions that are substantially uniform throughout the bulk volume of each electrode. Cathodes may have different characteristics from anode.

CFEB substrate solid material volume fraction, relative to the geometric volume of the electrode as a whole or bulk volume, should be in the range of 3% to 20%, leaving 97% to 80% open volume so that pores can contain other solid material and cross-flow electrolyte. Faradaic and other conducting materials can use 50% to 75% of the geometric volume, adjusted within that range so that 25% to 40% of the volume is available for electrolyte cross-flow.

Electrode scaffold volume density, as a fraction of the electrode's geometric volume, is chosen so that bulk volume resistivity should not exceed $10^{-3}$ ohm-cm. Alternatively, the resistivity of 1 $cm^2$ of electrode cross section should not exceed 0.001 ohm/cm of electrode thickness. Therefore, 10 $Amps/cm^2$ current output in a 1 cm thick electrode will produce only 0.1 $Watt/cm^2$ of heat. For example, Ni has a solid volume resistivity of $6.93 \times 10^{-6}$ ohm-cm. The relationship to bulk resistivity of an open porous nickel structure is non-linear so 1% volume density does not reach the target bulk resistivity; but, 12% volume density does yield bulk resistivity somewhat less than $10^{-3}$ ohm-cm.

As described above, a typical volumetric design point for nickel scaffold is 12% for solid metal scaffold, a maximum of 60% for other solids and a minimum of 28% to 35% for cross-flowing electrolyte filling all voids. The 60% for other solids may include 10% to 20% for non-faradaic conduction material, such as CNT or suitable forms of carbon. Thus, at least 50% to 40% of the geometric or gross electrode volume comprises faradaic material. The same parameters may be understood by considering the common properties of faradaic material powders and nanoflakes. In most cases, these materials can be processed to 55% of their solid crystal densities. When the open pore volume of a CFEB electrode $114_x$, $116_x$, $214_x$, $216_x$ is filled, 48% to 50% of the gross electrode volume contains efficiently participating, faradaic material with reference to the material's solid density. Mixing faradaic material with non-faradaic conductor material can reduce that factor to 40%; but, further dilution serves no purpose.

CFEB 100, 200 electrode architecture and the faradaic material morphology contained within the structure of each CFEB electrode $114_x$, $116_x$, $214_x$, $216_x$ have a substantial effect on battery performance. Faradaic materials within the pores of the CFEB electrode $114_x$, $116_x$, $214_x$, $216_x$ scaffold must remain fixed in place while electrolyte flows over and past nanoflake or particle surfaces. The faradaic materials must be firmly attached to the metal scaffold surfaces or to conducting elements (e.g., CNT) attached to the scaffold surfaces or the faradaic materials must be tightly packed (with conducting elements if required) so that no material can escape through a pore window. Several faradaic material morphologies that satisfy these conditions will be further described. These fall into two classes; namely, a) nano-particles and nanoflakes, and b) RANEY® metal-type inclusion structures having very high exposed surface areas per unit of mass.

The morphological distinctions are important because they control how electrolyte cross-flow interacts with faradaic material. All faradaic material surfaces are covered by an EDL interface with electrolyte. An outermost Helmholtz layer interfaces with a diffusion layer through which ionic species must cross for redox reactions to occur. That layer should be as thin as possible for high chemical activity.

If a particle presents a simple surface to cross-flowing electrolyte, then laminar shear will narrow the diffusion layer; but, the nano-particles or nanoflakes must be very small to possess high surface area per unit of mass or volume. RANEY® metal-type particles are usually larger particles; but, have higher surface areas per unit of mass or volume. However, the convection flow vectors of electrolyte propelled under high shear cannot penetrate within most of the RANEY® metal-type particle inclusions. Therefore, ion mass transport is concentration-gradient-driven over very short distances from within a small particle to the high laminar shear electrolyte flow surrounding the particle where forced convection dominates diffusion. Because diffusion rate constant is inversely proportional to the square of the diffusion path length, the effect is negligible for smaller particles. CFEB electrode engineering may require analytical and numerical modeling of power rating, flow parameters, EDL characteristics and cost tradeoffs between these faradaic material types depending upon requirements for a given application.

For example, powdered nickel particles have a typical density of 55% of solid nickel, which is 5 g/ml. This is 3-times as much nickel (and energy) as can be contained within a cathode of the earlier example. However, nickel metal is not a suitable faradaic material in nickel-type batteries because its surface-passivating oxide layer cannot be penetrated easily.

The initial active faradaic material must be either NiO, NiO(OH) or $Ni(OH)_2$. NiO can be purchased in RANEY® metal-type particle form having faradaic surface areas of 66 $m^2/gm$ in 1 to 2 μm particles. These RANEY® metal-type particles are equivalent in surface area to 12 nm size particles of any suitable material.

The RANEY® metal-type particles with 1 to 2 μm enclosing diameters have a packed density of 1.52 gm/ml. This is an appropriate size for scaffold pores of 10 to 25 μm. Material density can be doubled by grinding or ball milling the particles to 50 nm average size and containing them within 250 nm pores, as will be illustrated by further examples. An alternative is cost-effective $Ni(OH)_2$ particles that were used in the earlier example for estimating a nickel-based battery energy rating.

Electrode pore dimensions in the range of 0.2 to 20 μm in enclosing diameters are most useful; however, the range can extend to as much as 200 μm. Normally, finely divided faradaic material having the highest surface area per weight or volume will permit the highest current densities per electrode volume or area cross section. These faradaic materials are best incorporated in the smallest pores as electrodeposits on metal substrate for direct electrical contact with the current collecting scaffold. If immobile nanoscale faradaic particles must be injected and sintered into pores, then it will usually be necessary to add conducting (e.g., carbon) fibers to the mix to achieve adequate electron conduction to the supporting and current collecting scaffold.

Some faradaic intercalation materials have excellent $H^+$ or $Li^+$ ion solid state diffusion and surface electron conductivities. Examples are metal hydrides, MH, such as certain rare earth alloys (e.g., lanthanum alloyed with nickel) serving as anodes $114_x$, $214_x$, or ordered lithium spinel particles (e.g., spinels disclosed by Ma et al) serving as cathodes $116_x$, $216_x$ and Li as porous or intercalated metal serving as anodes $114_x$, $214_x$. These materials, in the form of 1 to 5 μm powders, can be packed and immobilized within 10 to 20 μm pores while retaining effective electron conductivity to the scaffold and may not require additional carbon.

In addition to Ma et al, other prior art references describe electrode structures that can be used to build CFEB of this invention. Zhang, et al, *Three-dimensional bicontinuous ultrafast-charge and-discharge battery electrodes*, Nature Nanotechnology, Letters and Supplement (20 Mar. 2011) is an example that is further described in Patent Application No. US 2010/0068623 of 18 Mar. 2010 to Braun et al for *Porous Battery Electrode For A Rechargeable Battery And Method Of Making The Electrode*. These have reference to unconventional battery architecture more fully described in Rolison, et al, *Multifunctional 3D nanoarchitectures for energy storage and conversion*, Chem. Soc. Rev. 38, 226-252 (2009) and Long, et al, *Three-dimensional battery architectures*, Chem. Rev. 104, 4463-4492 (2004). Similar electrode materials and chemistry are disclosed in Wu et al, *Capacitive Behavior of Porous Nickel Oxide/Hydroxide Electrodes with Interconnected Nanoflakes Synthesized by Anodic Electrodeposition*, J. The Electrochemical Society, 155 (11) A798-A805 (November 2008). These references illustrate some of the differences between CFEB and the prior art.

Zhang et al states at Page 1, col. 1, 1. 48 to col. 2, 1. 5:

Realization of an electrochemical energy storage system with supercapacitor-like rate performance and battery-like capacity requires the simultaneous minimization of the four primary resistances present during charge and discharge (FIG. 1b: (i) ion transport in the electrolyte, (ii) ion transport in the electrode, (iii) electrochemical reactions in the electrode and (iv) electron conduction in the electrode and current collector.

This description refers to only one of the battery electrodes. The problem is framed as follows at Page 1, col. 1, 11. 23-29:

It is well known that reductions in the characteristic dimensions of the electrolytically active material are more effective in improving battery cycling rates than increases in ion diffusivity D, because the characteristic time constant t for diffusion is proportional to the square of the diffusion length $L(t \approx L^2/D)$. By definition, nanoscale electrodes have exceptionally short ion and electron transport lengths.

From the Zhang et al FIGS. 1a & 1b, it is clear that all four primary resistances are path lengths that are internal to one electrode at a time. These separate electrode morphologies accomplish the authors' objective of reducing the four primary resistances over nanoscale distances. However, there is a fifth primary resistance that is in an electrolyte gap between electrodes. The electrolyte is required for the transport of ions and that path is not only long; but, generally impeded by a membrane.

The Rolison et al and Long et al papers address the fifth primary resistance obstruction with a 3-D electrode geometry that describe interdigitated-array batteries. By coating nanoscale flakes of faradaic materials with even thinner layers of electron-non-conducting electrolyte, it is theoretically possible to design interdigitated nanoscale flakes of opposite sign electrodes. That would shorten the final fifth primary resistance or ionic conduction path between electrodes. However, while it is possible (and even practical) to fabricate exceptionally thick nanoscale porous electrodes described by Zhang et al that are capable of holding a considerable amount of complimentary active material in each electrode, it is not possible to mix (interdigitate) thick bi-continuous electrodes to reduce the fifth primary resistance. CFEB 100, 200 of this invention eliminate the need to reduce the fifth primary resistance by creating energetic electrolyte cross-flow through the electrolyte gap. The result is a high performing practical and cost effective battery.

The objectives in all of the papers cited were either to a) accelerate movement of ions within and between electrodes, b) prevent formation of metallic dendrites on electrodes that could short-circuit cells, and c) reduce electrical resistance. While these goals may have been achieved, there is no evidence that any of the cells or batteries that were described are capable of discharging for an extended period at a rate in excess of 1 ampere/cm$^2$ of projected electrode surface.

The classic problem of achieving high current density for high power density and fast charging in prior art secondary batteries is one of balancing fast ion mass transport with low ohmic resistance. As the former improves to permit more current density the latter increases losses. An example of this is described in Ma, et al where the basic material has high rates of lithium ion conductivity within its molecular structure and good electron conductivity on particle surfaces. However, an assembled battery using a collection of such particles in a cathode falls far short of the material's potential performance. As disclosed in the Ma et al paper, the problem of ionic mass transport between particles and electrolyte and electron conduction between particles and electrode terminals requires structures that greatly limit performance.

The classic solution, as taught by Gozdz et al and by Ma et al is to shorten greatly the mass transport path over which both processes take place by applying a thin coating of material on a current collecting surface. Clearly, this limits projected area current density, which can only be compensated by increasing surface area. Packaging strategies only partially offset that disadvantage. Examples of current art have thick, porous electrodes with inherently low ohmic resistance and contain static electrolyte (e.g., lead/acid batteries). They can provide a packaging efficiency of expanded projected electrode surface area; but, limited ionic mass transport and slow charge capability.

This review of electrode structural morphologies draws a sharp distinction between electrodes for batteries and electrodes for super- or pseudo-capacitors. Electrodes that contain faradaic material with highly dispersed concentrated surface area in thick porous structures can rapidly exchange ions with electrolyte when the four primary resistances described by Zhang et al are reduced. However, this exchange of ions only works within nano-scale distances of an extremely thin electrolyte layer; namely, the EDL. Charge accumulation prevents the process from penetrating more than a few atoms into the solid material. Because it is a limited surface effect, the nano-scale thin layer of faradaic material uses a substantial fraction of the material weight to function as a pseudocapacitor. But to function as a battery in which ions are capable of penetrating and causing a more substantial fraction of the material weight to participate in a faradaic reaction; the accumulated charges must be swept away.

Charge dispersion can only happen if ions travel to the opposing electrode through the fifth primary resistance path of the electrolyte gap. Current art shortens that path by bringing two extremely thin, low material weight, layers into facing juxtaposition and causes packaging inefficiencies. Even the most advanced concepts proposed by Long et al and Rolison et al do not solve that problem. All of these prior art configurations lack an ideal combination of high rates of ionic mass transport and high rates of electrical conduction within and between both electrodes simultaneously. This combination is achieved for the first time by this invention.

The electrodes 114$_x$, 116$_x$, 214$_x$ and 216$_x$ used in the CFEB 100 and 200 embodiments are low solid volume density, highly porous metal meshes or foam matrices comprising connected strands or scaffolds of metal, They may contain additional electrically-conductive material (e.g., carbon or carbon nanotubes (CNT) filaments). If the metal is silver, then a solid volume density of 3 to 5% is sufficient to provide low-resistance, electric current carrying capacity. Nickel or nickel-chromium alloy, at one-fourth the conductivity, requires 12 to 20% solid volume for equivalent electric current carrying capacity.

The meshes or matrices are similar to that used in electrodes that are described in FIG. 1 of Zhang et al or in FIG. 6D of my U.S. Pat. No. 7,964,301 of 21 Jun. 2011, for Dynamic Accelerated Reaction Batteries Utilizing Taylor Vortex Flows, cited above. Metal foam pore structures can be coated with sufficient faradaic material as shown in FIG. 2 of Zhang et al to accumulate a sufficient weight of directly electrodeposited nanostructures. These are mainly intended by Zhang et al to be used as NiO(OH) cathodes for batteries based upon chemistry previously described. However, Yasutomi et al, *NiOOH(Li)$_x$ (x>0) Synthesized by New Chemical Method with Lithium-Napthalene Complex Solution for Active Materials of Lithium Secondary Cells*, GS YUASA News Technical Report (2004), describes a chemistry that would allow the Zhang et al NiO(OH) structure to be used for both anode and cathode Li intercalation.

Electrodes $114_x$, $116_x$, $214_x$, $216_x$ best suited to use with CFEB 100 and 200 generally comprise the following principal components:

1. A porous, electrically conducting open-cell mesh or foam forming a scaffold or framework that collects electrons and conveys electrical current with low resistivity to battery terminals, (open cell pores constituting 80% to 97% of the gross electrode volume);
2. Immobile particles of chemically active faradaic materials residing within the pores and reacting with electrolyte ions flowing through the pores to produce or accept ions and to produce or accept electrons in low resistance electrical communication with the scaffold; and
3. For faradaic material not directly attached (electrodeposited) to scaffold substrate, good electrical conductors (e.g., CNT or other conducting fibers) within the pores and in contact with the particles to provide an electric circuit from the particles to the scaffold.

These components should be engineered to promote both high chemical reactivity and low electrical resistance.

In particular, the scaffold, the faradaic particles and internal pore conducting materials, if needed, may be assembled and heat treated or sintered together to form a collective low-resistance electron path to the battery terminals. Particle displacement, aggregation, isolation by electrolyte, or tunneling by strong electrolyte cross-flow is not compatible with the method of this invention.

As reported by Ma et al, ordered lithium spinel has excellent surface electron conduction properties; but, when individual particles are assembled in a paste and surrounded by electrolyte, that conduction path is interrupted. In this invention, these particles would remain in tightly packed mutual contact within the metal scaffold pores. CFEB electrode architecture takes full advantage of the surface conduction of the spinel particles themselves and obviates a need for additional non-faradaic conducting material (e.g., carbon). Also, faradaic nickel oxides particles can be directly electrodeposited on scaffold metal or sintered and immobilized into durable mutual physical contact and unitary structure within pores. This process optimizes particle-to-particle electrical conduction by tightly packing and sintering particles within pores requiring a minimum of additional non-faradaic carbon.

Faradaic particles and carbon filaments or CNT may be mixed in a wide range of ratios depending upon the relative size of the filaments and particles. FIG. 3 is a normalized log-log graph useful for calculating the ratio of typical faradaic particles to carbon filament volumes that plots:

$$\alpha = \frac{V_T}{V_N}$$

as a function of $$\beta = 1 + \frac{V_C}{V_N}$$

where:
$V_T$=Total Volume of faradaic and carbon particles filaments or CNT;
$V_N$=Volume of faradaic particles; and
$V_C$=Volume of carbon.

The graph is typical of an empirical measurement of mixing particles of any size with carbon filamentary material of substantially smaller diameters and arbitrary lengths.

Because the carbon filaments nest in voids between the faradaic particles, the total volume of carbon filaments mixed into such particles is less than the sum of the separate particle and carbon filament volumes. The volume increase is initially gradual, as shown in FIG. 3, and approaches a point shown on the graph where the slope approaches 45°. A further increase in carbon volume will only disperse metal particles rather than form more electrical connections between the particles. This information may be used to optimize the ratio of carbon to metal weight.

The following formulae are useful:

$$\rho_T = (1/\alpha)\{\rho_C(\beta-1)+\rho_N\} \text{ and}$$

$$W_C/W_N = (\beta-1)(\rho_C/\rho_N)$$

where $\beta$ and $\alpha$ are read from the graph; W=weight, $\rho$=powder density and the subscripts T, N and C refer to net total, faradaic particle and carbon, respectively.

A very reasonable selection point on the graph taken at a near 45° tangent to the curve is where $\beta \cong 2.5$ and $\alpha \cong 1.5$. This is where, in one experiment, adding 15 grams of carbon to every 100 grams of a nickel oxide powder provides an optimum mixture for sintering within the pores of the metal scaffold. Other faradaic powders will require more or less carbon depending upon type and size of the powder.

FIG. 2A is a magnified view showing details of a typical cell $202_x$ of FIG. 2 comprising an anode $214_x$ having a fine mesh surface $274_x$ and a cathode $216_x$ having a fine mesh surface $276_x$ separated by a porous dielectric membrane or separator $219_x$ in the electrolyte gap $218_x$. The anode mesh $274_x$ and the cathode mesh $276_x$ have pore sizes that can be designed and fabricated in a range from 10 nm to 250 μm at their largest linear dimension (e.g., diameter, principal axis) to accommodate the cross-flow of electrolyte.

FIG. 2B is a magnified view showing details of typical adjoining cells $202_x$ and $202_{x+1}$ of FIG. 2 comprising a cathode $216_x$ with a mesh surface $286_x$ and an anode $214_{x+1}$ with a mesh surface $284_x$. The mesh surfaces $286_x$ and $284_{x+1}$ are optional and serve to help retain faradaic material particles in their adjoin electrodes $216_x$ and $214_{x+1}$. The mesh surfaces $286_x$ and $284_{x+1}$ are separated by a porous, electrically-conducting fine mesh $288_x$. that also accommodates the cross-flow of electrolyte.

Some suitable anodes $214_x$ for preferred embodiments using available high performance, chemically active particles have pores averaging about 250 nm; but, may average as much as 250 μm. The pores may contain micro-particles with sizes from $1/100^{th}$ of the size of a pore to nearly the size of a pore for average particle sizes ranging from 2 nm to 10 μm.

Similarly, the cathode $216_x$ comprises mesh having pore size averaging from about 10 nm to as much as 250 μm. The pores contain nano to micro-particles having average sizes of about 3 nm to 10 μm.

The electrolyte gap $218_x$ to be filled with electrolyte may either be empty or preferably it may be a dielectric spacer or separator of a non-electrically conducting material, such as a 10 to 20 mil-thick porous filter media membrane (e.g., WHATMAN® glass microfiber filters). Non-electrically conducting materials provide structural strength to the cell $202_x$ structures to permit stack compression that will maintain or improve electrical contact (i.e., reduce internal contact resistance) among component structures.

Ionic conductivity of the CFEB 100, 200 with electrolyte flow rates on the order of 1.0 cm/sec can generate current densities on the order of 2 to 10 A/cm². The current limiting factor becomes ohmic loss in a structure embodying the invention. Therefore, special attention should be paid to electrode configurations.

FIGS. 4A, 4B, 4C and 4D illustrate an electrode that provides both high permeability to electrolyte flow and low resistance to electric current. An ideal structure for the construction of electrodes $114_x$, $116_x$, $214_x$ and $216_x$ is a low material density (approximately 3% to 6%) open cell metal (Ag, Cu, Al, Ni or Ni—Cr alloy) foam scaffold.

Figure 4A:
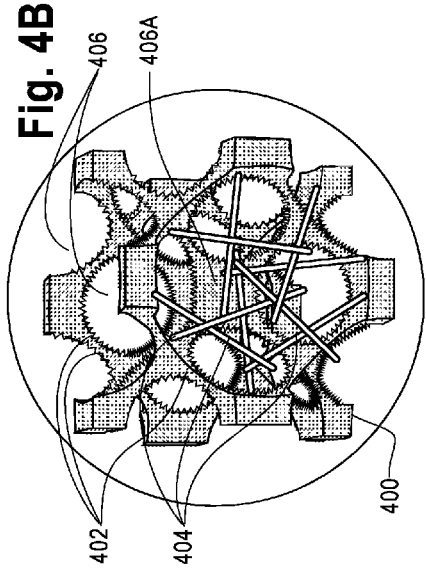
FIGS. 4A, 4B, 4C and 4D are magnified views of an electrode of this invention.

FIG. 4A illustrates a 94%-porous, electropolished (i.e., oxide free) nickel scaffold 400 current collector, which was described in Zhang et al FIG. 1(d) and in Braun et al FIG. 1(d). Zhang et al teach in FIG. 1(e) and Braun et al teach in FIG. 1(e) that the scaffold should be coated with an electrodeposit of electroactive materials.

Figure 4B:
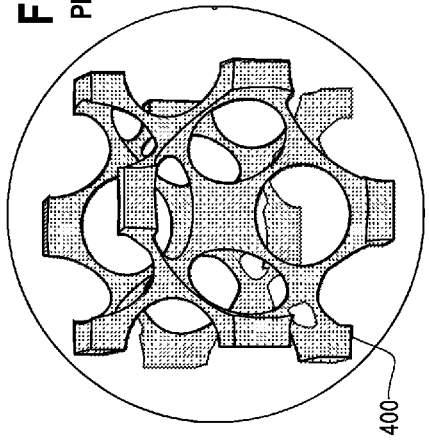

An alternative to electrodepositing directly faradaic nanoflake, as taught by Zhang et al and Braun et al, is shown in FIG. 4B where the scaffold 400 has been electrochemically treated to form catalytic surfaces 402 that support the formation of CNT 404 growing or extending from the pore surfaces 402 into orifices 406 of the scaffold 400. All of the orifices 406 contain CNT 404; however, they are only shown in central orifice 406A for drawing clarity. Faradaic nano-particles can be deposited on and firmly attached to the CNT which serve as excellent electron conductors to the metal scaffold.

Figure 4C:
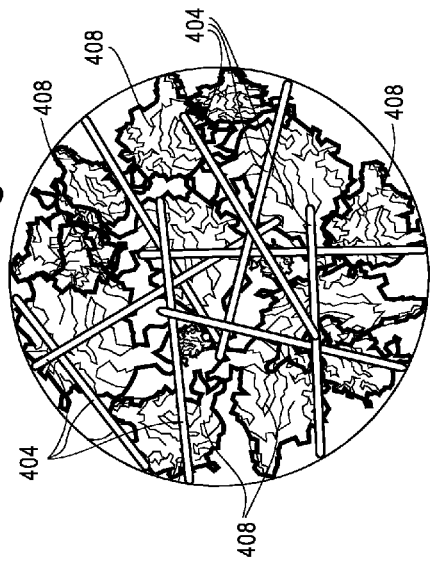

As shown in FIG. 4C, a paste or slurry containing faradaic particles 408 can be injection molded into all of the orifices 406 of the porous scaffold 400. As before, only the central orifice 406A is shown as containing the faradaic particles 408; however, all of the orifices 406 contain faradaic particles 408. The paste or slurry should contain a binder so that the paste can be injection molded under substantial pressure into the porous scaffold, which is inserted into a mold for this step in the procedure. Binder volume fraction is chosen to control net open cell porosity.

Figure 4D:
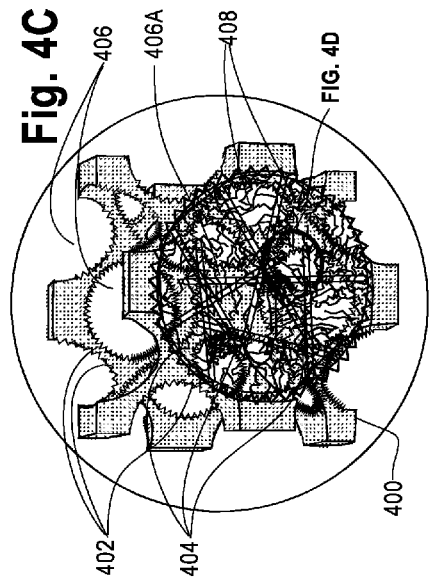

The electrode is then vacuum or hydrogen sintered to drive off the binder and form mutual attachment between the metal scaffold 400, the faradaic particles 408 and the CNT filaments 404 to create faradaic particle packed scaffolds as shown in FIG. 4C. FIG. 4D is a highly-magnified view of the faradaic particles 408 and the CNT 404 shown in the central orifice 404A of FIG. 4C. Particles 408 are illustrated as having irregular shape and many inclusions to indicate high structural surface area. Note that the central orifice 404A is unique only for the purpose of clarifying the drawings and is representative of all of the other orifices 404.

In order to improve electrical conductivity, CNT 404 with a total volume of approximately 15% of the particle volume can be mixed with the particles. Many of these CNT will serve as electrical conductors between the particles 408 and the electrode meshes $114_x$, $116_x$, $214_x$ and $216_x$. This will lower the impedance of the electrodes and reduce i²R electric power losses.

In some embodiments, the metal particles 408 may be a lithium spinel as a cathode material or intercalated lithium anode material of 3 to 5 μm in size locked respectively within aluminum and copper metal scaffolds 400 as previously described. The pores 406 are approximately 10 μm unit pore diameter and have 95 to 97% open pore volume. Both lithium and metal-hydrides are cation intercalation materials that do not necessarily depend upon nanoscale particle dispersions to exchange ions efficiently. Therefore, larger pore dimensions and thicker scaffold substrates may be used to contain these materials. Nickel oxyhydroxide functions best when directly electrodeposited on finely divided nickel scaffolds, as described by Zhang et al and Braun et al.

For Li-ion cells using organic or other non-aqueous electrolytes, bare copper can be used for the anode and bare aluminum can be used for the cathode. These materials will neither dissolve nor plate and are readily fabricated into porous meshes, foams and scaffolds.

Copper, nickel, nickel-chromium alloy and aluminum are relatively inexpensive metals that can be fabricated in the fashion described. Silver is more costly but may be appropriate in some applications. Any metal that is chosen for this application should be highly conductive. If it is vulnerable to corrosion or chemical interaction with electrolyte or battery active particles, then its surfaces may be coated with vitreous or graphene carbon. Such a thin coating will not seriously affect electrical conductivity of the net structure.

Sintered multiple layers of 304 or 316L stainless steel screen that do not require coating can be fabricated with approximately 19% material density and 100 ppi pore size. Copper and aluminum particles can be obtained in sizes ranging from 20 nm to 0.5 μm or larger if need be. It is possible to ball mill these together with a refractory material to produce an aggregate particle having a size of 10 to 20 times the size of the metal particle and coated or decorated with many metal particles. The uniform mixture of metal-coated material held in a binder can be injection molded and sintered at an appropriate temperature for the selected metal that will vaporize the binder and form a structural part. In a final step, the refractory can be dissolved away leaving only low density sintered metal open cell foam.

It is important to select an appropriate refractory material for the process just described. One material is anhydrous tribasic potassium phosphate ($K_3PO_4$). It does not melt below 1340° C., which is well above sintering temperature for many metals. It is insoluble in alcohol, such as ethanol, which allows it to be ball milled with metal particles. Also, it is very soluble in water at 100° C., which dissolves it from the sintered part with only an alkaline solution to be decanted. The anhydrous form of $K_3PO_4$ is a white crystalline powder that can be milled to sizes on the order of 0.1 to 10 μm.

When metal or intercalated lithium particles 408 are in electrodes $114_x$, $116_x$, $214_x$ and $216_x$ and the electrodes containing carbon filamentary material are sintered, the metal particles 408 become trapped within the pores. Consequently, the CFEB 100, 200 may be loaded with as many active faradaic particles 408 (e.g., $Ni(OH)_2$, Fe, MH or intercalated lithium) within a matrix of metal mesh or scaffold 400 (e.g., low boron electroless Ni for alkaline or aluminum for lithium cathodes and copper for the lithium anode, or stainless steel for Fe and MH anodes) as may be needed to achieve a given target loading factor.

The metal particle 408 surface areas can be greatly increased by starting with an alloy having an element (e.g., aluminum) that can be dissolved in a strong aqueous solution (e.g., acid or base) leaving jagged surfaces—similar to the method used to produce skeletal (e.g., sponge-metal or RANEY® metal-like) particles with jagged faradaic material surfaces. This will yield metal particles 408 that have both high surface area and high porosity. A preferred structure comprises particles in the range of 2-5 μm diameter within a porous structure, such as the sparse scaffolds 400 or metal foam. The particles may be mixed with or entangled within carbon filament to improve conductivity within the electrodes (114$_x$, 214$_x$, 116$_x$, 216$_x$).

It is essential to achieve tight packing or mutual attachment (e.g., sintering) of metal or intercalated lithium particles 408 to the fine conducting filaments, scaffolds 400. Tight packing and attachment will slightly reduce available particle active surface area and exposure to flowing electrolyte; but, is necessary for good electrical conduction. A further advantage of bulk porous electrode packing, in comparison to tightly wrapped Li-ion paste coatings and some other battery types, is reduction or elimination of diffusion-induced stresses in battery electrodes.

The preferred configuration provides stress relief due to recirculation of the electrolyte whereby volume changes can be provided by the BOP. Appropriate packing of particles will allow for the expansion or contraction of particles so that they can displace liquid electrolyte volume within the pores 406.

The packing of the pores 406 with particles 336 mixed with CNT 404 provides substantial electrical conductivity and an increase in chemically active electrode/electrolyte interface area ratio. At a minimum, spherical powder surface area is $6\rho/D$ in cm$^2$ per cm$^3$ or $6\rho T/D$ to represent the net powder surface area per unit of projected electrode area. $\rho$ is the solid volume fraction within the porous electrode structure occupied by powder, T is electrode thickness and D is the particle diameter in consistent units.

A reasonable estimate for the value of $\rho$ using porous structures described in this disclosure would be approximately 0.45. For a 6,350 μm-thick electrode and a 1.0 μm particle diameter, at least a current density multiple of 17,145 can be expected. For irregular shaped and RANEY® metal-type particles, the multiple is much higher.

If the basic particle or bare metal surface activity in terms of mA/cm$^2$ in the absence of surface ion mass transport limitations is known, then it would be possible to apply the area factor to calculate an expected electrode current density. However, there is a dearth of such information measured under the appropriate ion mass transport conditions. Nevertheless, it is reasonable to expect higher values of bare surface current density with high-shear laminar boundary layer flow over the particles.

A solid surface activity value of 0.583 mA/cm$^2$ is all that is required to achieve 10 A/cm$^2$ with 1.0 μm spherical particles. Smaller particles, thicker electrodes or irregular shaped and Raney particles can reach the same projected electrode current density with substantially less intrinsic surface activity. Actual operating current increase under load will be due to ohmic and other losses; but, these losses can be minimized.

Flow resistance through porous media has been extensively analyzed both theoretically and as a practical engineering matter providing reference handbooks covering a wide range of material properties and structural characteristics. As used here, the porous materials are assumed to be hydrophilic with the electrolyte being liquid and Newtonian.

There can be considerable variation in flow properties for different types of pore structures. Micropore surface molecular interaction between materials such as Corning VYCOR® porous glass with nanoscale pores interacting with water and organic molecules do not apply to materials used in this application. By far, the most reliable estimate of flow resistance has reference to experimental values and published data using comparable materials and pore structures to those taught here; such as AEROLITH® (AE) filter media manufactured by Pall Corporation.

The range of key parameters such as pore size and pore volume fraction covered in Pall Corporation published data closely represents that for the electrodes 114$_x$, 116$_x$, 214$_x$ and 216$_x$. For a nominal pore dimension of 10 μm and pore volume fraction of 40%, a pressure differential of 9 kPa/cm of filter depth for water flowing with a velocity of 1.0 cm/sec is required. Pressure has a complex inverse relationship to pore volume fraction as a function of internal surface area.

For present purposes, values of 40% open volume and 9 kPa/cm of electrode depth are suitable points of reference. A typical battery stack designed as depicted in FIG. 2 and having 10 unit cells 202$_x$ will produce 12 volts. Each unit cell 202$_x$ comprises two electrodes each 6.35 mm thick for a net stack depth of 127 mm (5 inches). Consequently, the pressure required to pump electrolyte through the CFEB 200 at 1.0 cm/sec is 114.3 kPa. Without allowing for pump loss, the electric power required is 0.1143 watt/cm$^2$ of projected electrode area at the stated flow velocity of 1.0 cm/sec. The expected electric current density is at least 2 amperes per cm$^2$ or 24 watts/cm$^2$ at 12 volts. It may be reasonably concluded that electrolyte pumping requires less than ½% of peak power.

For most porous media and fluids, the relationship between pressure drop, ΔP, and liquid flow velocity, v, can be very well approximated by a linear relationship for values of v from 0 to $v_L$ for which flow within the porous structure remains laminar. A generalized expression over a wider range, including turbulence, is given by:

$$\frac{\Delta P}{\Delta P_L} = \frac{e^{\frac{v}{v_L}} - 1}{e - 1}$$

FIG. 5 is a graph of experimental data obtained during charging of 55 cm$^2$ projected area electrodes in a single Ni—Fe cell comprising sintered 10 to 20 μm particles; but, having no other structural porous metal current collector. The electrodes were not of the design taught here and had a high internal resistance that caused substantial ohmic losses above 257 mL/min and 2 amps. The sole purpose of the experiment was only to determine whether charging current was a positive function of cross-flow electrolyte rate and these data showed that this was true.

The charging voltage was set to a constant 1.7 volts. The cell charging current increased from about 0.05 Ampere to 2.2 Amperes as the electrolyte flow rate was varied from 0 to 275 ml/min along a curve approximated by the formula:

$$i = A \left\{ 1 - \frac{\left(1 - \frac{a}{A}\right)}{e^{aF}} \right\}$$

where:
- i=Instantaneous Charging Current;
- A=Maximum Charging Current (Impedance Limited);
- a=Charging Current At 0 L/min Flow Rate;
- α=Ionic Conductivity Factor; and
- F=Flow Rate in L/minute, where $0 \geqq F \geqq 275$ mL/minute The five ○ symbols represent actual measurement points and the dotted line represents an interpolation through the measurement points. These data show that the charging current increased from negligible to as much as 4400% when electrolyte cross-flow was established up to 275 mL/minute—thereby proving that electrolyte convection in a CFEB dramatically improves power and energy density over migration and diffusion in prior art batteries.

Construction

CFEB can be built in a wide spectrum of sizes and power/energy ranges that permit tailoring a unit to any of a variety of applications. The subsequent information provides guidance for estimating construction requirements.

The following is an analysis of kWh battery capacity built in accordance with CFEB 200 of FIG. 2. The CFEB 200 is approximately 13 cm in diameter and 25 cm in length, discounting container dimensions. Its electrodes 214$_x$, 216$_x$ are chosen to have a combined thickness of 24.5 mm and its electrolyte gap 218$_x$ is 0.5 mm wide. Therefore, a unit cell 202$_x$ is 25 mm thick. Electrodes 214$_x$ and 216$_x$ have projected areas of about 150 cm$^2$. The battery contains ten cells 202$_x$ for a stack length of about 25 cm and volume of 3.75 liters, not counting containment structure.

The output voltage across the terminals 240-248 will be 12 volts for a Ni—Fe or Ni-MH battery to as much as 45+ volts for a Li-ion battery, such as previously described. If electrolyte is circulated at a maximum rate of 9 LPM or 150 cc/sec through the entire stack, then electrolyte is entering each 0.25 mm gap at a velocity of 1.0 cm/sec. The electrolyte will collectively cross each 0.5 mm gap in about 50 milliseconds. Local velocities within porous structures are higher.

One question is whether these specifications will provide acceptable power for some applications and an answer is found in an analysis of the concentration of ions and the ionic current being carried by the electrolyte flow. That analysis was provided for several battery specie on the basis of a target projected current density of 10 Amp/cm$^2$ and found to be well within the capacity of CFEB. Therefore, an analysis using these power and energy parameters predicts that the battery can deliver 1,500 amps at rated voltage. Diffusion across the gap 218$_x$ can be ignored as the principal force is convection.

For both Ni-based and Li batteries, it is assumed that the electrode active particle packing density will be 60% because the particle loaded meshes 300, 320, 330 are approximately 90% open porous (10% solid) in their unloaded state for adequate electron conduction over short path length for a net open porosity of 30%. The flow pressure drop is not a significant power drain for incompressible flow. Using data described in the Ma et al reference previously cited and my DARB U.S. Pat. No. 7,964,301, the battery energy in terms of raw material weight is 0.658 Wh/gm at 4.7 volts for 3 to 5 µm powder Li spinel. The solid density of typical spinel particles can be approximated at about 3.6 gm/ml. When formed as a refractory powder, the spinel particles retain about 50% open interstice volume and require very little, if any, added carbon and no PTFE binder as used in a CFEB electrode. Consequently, it is reasonable to use a value of at least 1.5 gm/ml for the spinel particle material density in a CFEB cathode after allowing for about 15 wt. % carbon. For Ni-MH, the assumed electrode parameters correspond to the earlier calculation of approximately 0.5 kWh/liter at 1.2 volts. Total electrode volume yields 1.875 kWh for that example.

The cathode half-cell in the 10-cell series CFEB stack should be twice the thickness of the anode half-cell, which is easily justified for both NiMH and Li-ion battery types. Again for the Li-ion case, energy rating is based upon cathode faradaic material density limitations. Thus, 150 cm$^2$ times 1.63 cm thickness corresponds to 245 cm$^3$ of physical volume per cathode. 90% of that volume is available to load spinel particles. The net energy determinant material volume for the entire stack is 245 cm$^3 \times$10 cells/battery=2.45 liters of cathode volume per battery. The total energy capacity is 2.45 liter×90%×1.5 gm/cm$^3$×0.658 Wh/gm=2.176 kW-h using the ordered Li spinel reported by Ma et al. This is partly due to the difference in voltage of 1.2 volts compared to 4.7 volts between the two examples.

The volume of the stack is 3.75 liters so the energy density is 0.58 kWh/liter and 0.5 kWh/liter for the Li-ion and Ni-Mh cases, respectively. In terms of net volumetric energy capacity these values are somewhat, but not substantially, better than current art for NiMH and Li-ion using ordered Li spinel particles as described by Ma et al. The more significant benefit derives from the greatly improved power density for the charge/discharge cycle.

From these data, it appears that 388 liters or 102 gallons of Li-ion battery would be required to power an automobile about 390 miles in 6 hours at 65 mph using 50 average horsepower or 37.5 kW and 225 kWh of energy. This is about as efficient as battery energy volume packaging can get and suggests that battery power, alone, for automotive transportation may not be as promising as fuel cell power from the standpoint of energy storage capacity. Even though the CFEB version of the Li-ion battery can deliver the high current density required for fast charge and discharge, it is not certain that convenient and powerful charging stations would be available.

An important aspect of the example is power capacity to meet instantaneous vehicle acceleration demand. It was demonstrated in the Li-ion battery described above that current densities of 10 A/cm$^2$ are now possible with CFEB. Such a one battery stack CFEB can provide 1,500 Amperes at 4.7×10 volts or 70.5 kW, which is 94 horsepower for 30 seconds. A practical transportation vehicle could combine a fuel cell, as in U.S. Pat. No. 7,972,747, cited above, for continuous power with one or two example Li-ion stacks for peak power of 141 kW or 190 horsepower. That would require only 7.5 liters or 2 gallons of Li-ion battery.

When load impedance drops to demand more current (e.g., motor acceleration), the electrolyte needs to create or deposit ions instantaneously on the exposed electrode surfaces. A question is whether ionic current in the electrolyte gap can satisfy electric current demand? The example shows that one battery stack can provide a momentary 100 horsepower or 75 kW of electric energy on demand.

The following calculation determines limits on recharge rate. The single Li-ion example battery stack can provide nearly the required 75 kW peak power at 167 C discharge rate. However, rapid charging affects discharge capacity. A 5 C charge rate would yield about one-half the peak energy storage capacity. This means that peak power could be sustained for 15 instead of 30 seconds. Based upon the Ma et al paper, a 5 C charge rate at 5 volts per cell is 0.3 A/cm$^2$×5=1.5 W/cm$^2$ times 1500 cm$^2$ or 2,250 watts of charging power. Recharge to one-half energy would take 12 minutes. Additional stacks would cut recharge time proportionately and increase energy storage.

It does not matter how wide the electrolyte gap is for determining current or power density except, of course, wider gaps require more volume. What determines the current and power density in this flow-through configuration is the electrolyte flow rate and excess ion concentration. The faster the flow rate, the less concentrated the ions need to be. Widening the gaps delays response.

In the example shown above, 50 milliseconds is required for a change of ion concentration to affect an opposing electrode at an electrolyte flow rate of 1 cm/s. Once having reached a new ion concentration, the recirculation rate should be determined by reaction delay, not continuous power demand.

It is clear that 4 to 5 molar hydroxyl concentration will support much higher ion concentration and current density on recharge. A CFEB as described can discharge 150 kW at 200 C. rapidly; however, charging in reasonable time requires high current. If two battery stacks are charged to 150 kWh and are to be charged in 0.1 hour, it will require a 9 kW power supply at 5 volts. That is 3% of the battery 2-stack peak 46 second discharge current.

It has already been shown that the stack can support such a high current provided the electrolyte molar concentration and electrolyte flow rate are maintained as described. Currents would have to be 10 amps/$cm^2$ for discharge and 0.3 A/$cm^2$ for charging; which can be supported by the electrodes—especially at somewhat increased electrolyte flow rates. The bigger question is where are such charging currents to be found? A 500 volt—4,000 amp power supply could meet such a requirement; but, that raises questions about capital costs, electrical connector capability and the like. The point is that a reasonable battery to take a car at power for 400 miles can be built; but, there are very few facilities to charge it in 6 minutes or as fast as a gasoline station pump can fill a fuel tank.

In one embodiment, an electrochemical battery (100, 200) for connection to an electrical circuit (146, 246) comprises: a first electrode (116$_x$, 216$_x$) of one polarity that can be connected to the electrical circuit (146, 246); a second electrode (114$_x$, 214$_x$) of an opposite polarity that can be connected to the electrical circuit (146, 246); a dielectric gap (118$_x$, 218$_x$) interfaced between the electrodes (114$_x$, 116$_x$, 214$_x$, 216$_x$), and means (124, 126 106$_x$, 104$_x$, 130, 132, 134, 224, 226, 206, 204, 230, 232, 234) for pumping electrolyte cross-flow from within the first electrode (116$_x$, 216$_x$), across the dielectric gap (118$_x$, 218$_x$), into the second electrode (114$_x$, 214$_x$), and back into the first electrode (116$_x$, 216$_x$).

In one embodiment, an electrochemical battery (100, 200) for connection to an electrical circuit (146, 246) and containing first (114$_x$, 214$_x$) and second (116$_x$, 216$_x$) electrodes for connection to the electrical circuit (146, 246), a dielectric gap (118$_x$, 218$_x$) for electrolyte between the electrodes (114$_x$, 116$_x$, 214$_x$, 216$_x$), an improvement comprising: means (124, 224) for pumping the electrolyte cross-flow in the same direction from within the first electrode (114$_x$, 116$_x$, 214$_x$, 216$_x$), across the dielectric gap (118$_x$, 218$_x$), into the second electrode (114$_x$, 116$_x$, 214$_x$, 216$_x$) and back to the first electrode (114$_x$, 116$_x$, 214$_x$, 216$_x$).

In one embodiment, a method of converting chemical energy into electrical energy in a galvanic cell containing a first electrode (116$_x$, 216$_x$) of one polarity, a second electrode (114$_x$, 214$_x$) of an opposite polarity and a dielectric gap (118$_x$, 218$_x$) interfaced between the electrodes (114$_x$, 116$_x$, 214$_x$, 216$_x$) comprising the step of pumping electrolyte cross-flow from within the first electrode (116$_x$, 216$_k$), across the dielectric gap (118$_x$, 218$_x$), into the second electrode (114$_x$, 214$_x$), and back into the first electrode (116$_x$, 216$_x$).

In one embodiment, a method of converting chemical energy into electrical energy in a galvanic cell containing a first electrode (116$_x$, 216$_x$) of one polarity, a second electrode (114$_x$, 214$_x$) of an opposite polarity and a dielectric gap (118$_x$, 218$_x$) interfaced between the electrodes (114$_x$, 116$_x$, 214$_x$, 216$_x$) comprising: pumping electrolyte cross-flow from within the first electrode (116$_x$, 216$_x$), across the dielectric gap (118$_x$, 218$_x$), into the second electrode (114$_x$, 214$_x$), and back into the first electrode (116$_x$, 216$_x$).

In the various embodiments, (i) at least one of the electrodes (114$_x$, 116$_x$, 214$_x$, 216$_x$) has a thickness of at least 3,175 μm; and/or (ii) at least one of the electrodes (114$_x$, 116$_x$, 214$_x$, 216$_x$) has a thickness in the range of 3,175-12,700 um; and/or (iii) wherein at least one the electrodes (114$_x$, 116$_x$, 214$_x$, 216$_x$) comprise scaffolds (400) having cell pores (406) constituting 80% to 97% of the gross electrode volume that are porous, open-cell matrix current collectors in electrical contact with faradaic material particles secured within their pores; and/or (iv) wherein scaffolds further comprise carbon nanotubes (404) extending from pore surfaces (402) into the cell pores (406); and/or (v) wherein the scaffolds (400) have jagged faradaic material surfaces (402); and/or (vi) wherein the faradaic material particles (408) are made from an alloy comprising an element that can be dissolved in a strong aqueous solution to produce jagged faradaic material surfaces (402); and/or (vii) wherein the particles (408) have diameters in the range of 2 nm to 5 μm; and/or (viii) wherein the particles (408) are mixed with filaments (404); and/or (ix) wherein the filaments (404) are carbon nanotubes; and/or (x) wherein the electrolyte in the dielectric gap (118$_x$, 218$_x$) is aqueous; and/or (xi) wherein the aqueous electrolyte is an alkaline electrolyte; and/or (xii) wherein the alkaline electrolyte comprises a hydroxide; and/or (xiii) wherein the aqueous electrolyte is an acid electrolyte; and/or (xiv) wherein the acid electrolyte comprises at least three oxygen atoms per molecule; and/or (xv) wherein one electrode comprises lithium, and the electrolyte in the dielectric gap (118$_x$, 218$_x$) is a solvent liquid containing a lithium salt; and/or (xvi) the solvent is an organic liquid; and/or (xvii) the first electrode is an anode containing lithium intercalated carbon particle and the second electrode is a cathode containing lithium spinel particles; and/or (xviii) the particles have sizes in the range of 2 to 7 microns; and/or the electrode comprising lithium is the first electrode and is an anode; and/or (xix) the means (124, 126 106$_x$, 104$_x$, 130, 132, 134, 224, 226, 206, 204, 230, 232, 234) for pumping electrolyte cross-flow pumps electrolyte during both discharging and charging cycles from within the first electrode (114$_x$, 116$_x$, 214$_x$, 216$_x$), across the dielectric gap (118$_x$, 218$_x$), into the second electrode (116$_x$, 216$_x$, 114$_x$, 214$_x$), and back into the first electrode (114$_x$, 116$_x$, 214$_x$, 216$_x$); and/or (xx) a fluid-transparent membrane (119$_x$, 219$_x$) separates the electrodes; and/or (xxi) comprising in addition means (160, 260, 264$_x$, 266, 268$_x$, 270) for providing feedback control to adjust chemical variables in the electrolyte; and/or (xxii) comprising in addition means (160, 260, 264$_x$, 266, 268$_x$, 270) for regulating the velocity of electrolyte flowing through an electrode in response to the magnitude of electrical current flowing in the electrical circuit (146, 246).

Conclusion

A fundamental principle of this invention is that electrolyte cross-flow through battery and cell electrodes with a velocity on the order of 1 cm/sec can produce 1000 times the ionic mass transport rate of prior art batteries. This not only increases power density; but, somewhat expands energy density because electrodes that store energy can be made very much thicker than prior art batteries. However, the main figure of merit, which is projected area current density, benefits from the multiplication of large chemically active particle surface areas, even though the particles are stored within thick electrode structures, because of high ionic mass transport rates.

The CFEB and electrodes of this invention offer electrochemical energy conversion systems far exceeding the long-standing less than 1-Ampere/cm$^2$ battery electrode performance barrier of the prior art. While the present disclosure has been presented above with respect to the described and illustrated embodiments of CFEB, it is to be understood that the disclosure is not to be limited to those alternatives and described embodiments.

What is claimed is:

1. An electrochemical battery (100, 200) for connection to an electrical circuit (146, 246) comprising:
   a. a first porous electrode (114$_x$, 116$_x$, 214$_x$, 216$_x$) of one polarity that can be connected to the electrical circuit (146, 246);
   b. a second porous electrode (116$_x$, 216$_x$, 114$_x$, 214$_x$) of an opposite polarity that can be connected to the electrical circuit (146, 246);
   c. a dielectric gap (118$_x$, 218$_x$) interfaced between the electrodes (114$_x$, 116$_x$, 214$_x$, 216$_x$), and
   d. means (124, 126 106$_x$, 104$_x$, 130, 132, 134, 224, 226, 206, 204, 230, 232, 234) for pumping electrolyte cross-flow:
      i. from within the first electrode (114$_x$, 116$_x$, 214$_x$, 216$_x$),
      ii. across the dielectric gap (118$_x$, 218$_x$),
      iii. into the second electrode (116$_x$, 216$_x$, 114$_x$, 214$_x$), and
      iv. back into the first electrode (114$_x$, 116$_x$, 214$_x$, 216$_x$).

2. The electrochemical battery (100, 200) of claim 1 wherein at least one of the electrodes (114$_x$, 116$_x$, 214$_x$, 216$_x$) has:
   a thickness of at least 3,175 µm.

3. The electrochemical battery (100, 200) of claim 1 wherein at least one of the electrodes (114$_x$, 116$_x$, 214$_x$, 216$_x$) has:
   a thickness in the range of 3,175-12,700 µm.

4. The electrochemical battery (100, 200) of claim 1 wherein:
   at least one of the electrodes (114$_x$, 116$_x$, 214$_x$, 216$_x$) comprises scaffolds (400) having cell pores (406) constituting 80% to 97% of the gross electrode volume.

5. The electrochemical battery (100,200) of claim 4 wherein at least one of the electrodes comprises:
   a porous current collector (400) in electrical contact with faradaic material particles (408) secured within its pores (406).

6. The electrochemical battery (100,200) of claim 5 wherein the porous current collector (400) comprises:
   an open-cell matrix containing faradaic materials (408) secured within its pores (406).

7. The electrochemical battery (100, 200) of claim 4 comprising in addition:
   carbon nanotubes (404) extending from the pore surfaces (402) into the cell pores (406).

8. The electrochemical battery (100, 200) of claim 4 wherein the scaffolds (400) have:
   jagged faradaic material surfaces (402).

9. The electrochemical battery (100, 200) of claim 5 wherein the particles (408) are made from:
   an alloy comprising an element that can be dissolved in a strong aqueous solution to produce jagged faradaic material surfaces.

10. The electrochemical battery (100, 200) of claim 5 wherein the particles (408) have:
    enclosing diameters in the range of 2 nm to 5 µm.

11. The electrochemical battery (100, 200) of claim 5 wherein the particles (408) are:
    mixed with filaments (404).

12. The electrochemical battery (100,200) of claim 11 wherein the filaments (404) are:
    carbon nanotubes.

13. The electrochemical battery (100, 200) of claim 1 comprising in addition:
    a fluid-transparent membrane (119$_x$, 219$_x$) separating the electrodes.

14. The electrochemical battery (100, 200) claim 1 wherein:
    the electrolyte in the dielectric gap (118$_x$, 218$_x$) is aqueous.

15. The electrochemical battery (100, 200) of claim 14 wherein the aqueous electrolyte is:
    an alkaline electrolyte.

16. The electrochemical battery (100, 200) of claim 15 wherein the alkaline electrolyte comprises:
    an hydroxide.

17. The electrochemical battery (100, 200) of claim 14 wherein the aqueous electrolyte is:
    an acid electrolyte.

18. The electrochemical battery (100, 200) of claim 17 wherein the acid electrolyte comprises:
    at least three oxygen atoms per molecule.

19. The electrochemical battery (100, 200) of claim 1 wherein:
    a. at least one electrode (114$_x$, 214$_x$) comprises lithium, and
    b. the electrolyte in the dielectric gap (118$_x$, 218$_x$) is a solvent containing a lithium salt.

20. The electrochemical battery (100,200) of claim 19 wherein the solvent is:
    an organic liquid.

21. The electrochemical battery (100, 200) of claim 1 wherein:
    a. the first electrode (114$_x$, 214$_x$) is an anode containing lithium intercalated carbon particles (408); and
    b. the second electrode (116$_x$, 216$_x$) is a cathode containing lithium spinel particles (408).

22. The electrochemical battery (100, 200) of claim 21 wherein the lithium spinel particles (408) have enclosing diameter sizes in a range of:
    2 to 7 microns.

23. The electrochemical battery (100, 200) of claim 19 wherein the electrode comprising lithium is:
    the first electrode (114$_x$, 214$_x$) and is an anode;
    and the means (124, 126 106$_x$, 104$_x$, 130, 132, 134, 224, 226, 206, 204, 230, 232, 234) for pumping electrolyte cross-flow pumps electrolyte during both discharging and charging cycles:
       i. from within the first electrode (114$_x$, 116$_x$, 214$_x$, 216$_x$),
       ii. across the dielectric gap (118$_x$, 218$_x$),
       iii. into the second electrode (116$_x$, 216$_x$, 114$_x$, 214$_x$), and
       iv. back into the first electrode (114$_x$, 116$_x$, 214$_x$, 216$_x$).

24. The electrochemical battery (100, 200) of claim 1 comprising in addition:

means (160, 260, 264$_x$, 266, 268$_x$, 270) for providing feedback control to adjust chemical variables in the electrolyte.

25. The electrochemical battery (100, 200) of claim 1 comprising in addition:

means (160, 260, 264$_x$, 266, 268$_x$, 270) for regulating the velocity of electrolyte flowing through an electrode in response to the magnitude of electrical current flowing in the electrical circuit (146, 246).

26. In an electrochemical battery (100, 200) for connection to an electrical circuit (146, 246) and containing:

first (114$_x$, 116$_x$, 214$_x$, 216$_x$) and second (116$_x$, 216$_x$, 114$_x$, 214$_x$) porous electrodes for connection to the electrical circuit (146, 246) and a dielectric gap (118$_x$, 218$_x$) for electrolyte between the electrodes (114$_x$, 116$_x$, 214$_x$, 216$_x$), an improvement comprising:

means (124, 224) for pumping the electrolyte cross-flow in the same direction from:
  i. from within the first electrode (114$_x$, 116$_x$, 214$_x$, 216$_x$),
  ii. across the dielectric gap (118$_x$, 218$_x$),
  iii. into the second electrode (116$_x$, 216$_x$, 114$_x$, 214$_x$), and
  iv. back into the first electrode (114$_x$, 116$_x$, 214$_x$, 216$_x$).

27. A method of converting chemical energy into electrical energy in a galvanic cell containing a first porous electrode (116$_x$, 216$_x$) of one polarity, a second porous electrode (114$_x$, 214$_x$) of an opposite polarity and a dielectric gap (118$_x$, 218$_x$) interfaced between the electrodes (114$_x$, 116$_x$, 214$_x$, 216$_x$) comprising the step of:

pumping electrolyte cross-flow:
  i. from within the first electrode (114$_x$, 116$_x$, 214$_x$, 216$_x$),
  ii. across the dielectric gap (118$_x$, 218$_x$),
  iii. into the second electrode (116$_x$, 216$_x$, 114$_x$, 214$_x$), and
  iv. back into the first electrode (114$_x$, 116$_x$, 214$_x$, 216$_x$).

* * * * *